(12) United States Patent
Yang et al.

(10) Patent No.: US 12,461,626 B2
(45) Date of Patent: Nov. 4, 2025

(54) CUSTOM BUTTON FOR A VEHICLE

(71) Applicant: Atieva, Inc., Newark, CA (US)

(72) Inventors: Yunwei Yang, Newark, CA (US); Sizhe Huang, Newark, CA (US); Dave Flynt, Newark, CA (US)

(73) Assignee: ATIEVA, INC., Newark, CA (US)

( * ) Notice: Subject to any disclaimer, the term of this patent is extended or adjusted under 35 U.S.C. 154(b) by 0 days.

(21) Appl. No.: 18/504,048

(22) Filed: Nov. 7, 2023

(65) Prior Publication Data
US 2025/0147619 A1 May 8, 2025

(51) Int. Cl.
| | |
|---|---|
| *G06F 3/041* | (2006.01) |
| *B60K 35/10* | (2024.01) |
| *B60K 37/06* | (2006.01) |
| *B62D 1/04* | (2006.01) |
| *G06F 3/044* | (2006.01) |
| *G06F 3/04817* | (2022.01) |
| *G06F 3/0482* | (2013.01) |
| *G06F 3/0488* | (2022.01) |

(52) U.S. Cl.
CPC .......... *G06F 3/04166* (2019.05); *B60K 35/10* (2024.01); *B62D 1/046* (2013.01); *G06F 3/04817* (2013.01); *G06F 3/0482* (2013.01); *G06F 3/0488* (2013.01); *B60K 2360/128* (2024.01); *G06F 3/044* (2013.01)

(58) Field of Classification Search
CPC ............. G06F 3/04166; G06F 3/04817; G06F 3/0482; G06F 3/0488; G06F 3/044; B60K 35/10; B60K 2360/128; G62D 1/046
See application file for complete search history.

(56) References Cited

U.S. PATENT DOCUMENTS

| | | | |
|---|---|---|---|
| 2007/0152977 A1 | 7/2007 | Ng et al. | |
| 2010/0268426 A1* | 10/2010 | Pathak | G06F 3/04886 345/173 |
| 2015/0046030 A1 | 2/2015 | Nishito et al. | |
| 2016/0121825 A1 | 5/2016 | Kim | |
| 2017/0024553 A1 | 1/2017 | Chang | |
| 2017/0357398 A1 | 12/2017 | Alonso-Ruiz | |
| 2018/0196589 A1* | 7/2018 | Feit | B60K 35/00 |
| 2019/0152319 A1 | 5/2019 | Wan et al. | |
| 2020/0039558 A1 | 2/2020 | Aerts et al. | |
| 2020/0307379 A1* | 10/2020 | Balain | B60K 35/10 |

(Continued)

OTHER PUBLICATIONS

International Search Report and Written Opinion received for PCT Patent Application No. PCT/US2024/054573, mailed on Feb. 6, 2025, 13 pages.

(Continued)

*Primary Examiner* — Lixi C Simpson
(74) *Attorney, Agent, or Firm* — Womble Bond Dickinson (US) LLP

(57) ABSTRACT

Embodiments relate to a method and apparatus for selecting and performing a function selectable by a custom button by a user in a vehicle, utilizing an on-board system controller, the on-board system controller comprising a processor and a memory. The method includes the operations of: identifying a pressing of a custom button; receiving a selection of a function from a display panel; linking the function to the custom button; and automatically performing the function when the custom button is subsequently pressed.

17 Claims, 21 Drawing Sheets

(56) References Cited

U.S. PATENT DOCUMENTS

| | | |
|---|---|---|
| 2021/0031711 A1* | 2/2021 | Marcolino Quintao Severgnini ............. B60K 35/10 |
| 2021/0252979 A1 | 8/2021 | Pomytkin et al. |
| 2022/0314794 A1* | 10/2022 | Eo ......................... B60K 35/00 |
| 2023/0120950 A1 | 4/2023 | Rashmi |
| 2023/0152961 A1 | 5/2023 | Perea-Ochoa |
| 2024/0267612 A1* | 8/2024 | Shimosato ............ G06F 3/0482 |

OTHER PUBLICATIONS

International Search Report and Written Opinion received for PCT Patent Application No. PCT/US2024/054562, mailed on Nov. 26, 2024, 11 pages.

Non-Final Office Action received for U.S. Appl. No. 18/902,288, mailed on Jul. 14, 2025, 12 pages.

* cited by examiner

Steering Wheel Custom Button

STEERING WHEEL CONTROLS
Shorcuts - Empty State (Nav, Media, Phone Recents)
When there's no recent history from the app, empty state should be displayed

CUSTOM BUTTON FOR A VEHICLE

FIELD

Embodiments disclosed herein relate generally to a vehicle, and more particularly, to a method and apparatus for allowing a user in the vehicle to select a function and automatically implement, or otherwise perform, the function by using a custom button.

BACKGROUND

Modern luxury vehicles offer a number of user amenities that provide the user with a more enriching experience and attempt to cater to each user and their particular wants and needs. For example, features that have become commonplace among luxury vehicles that are selectable by the driver or passengers may relate to: navigation functions, media functions (e.g., satellite music and entertainment channels, radio music and entertainment channels, the Internet, etc.), driving functions, climate functions, application functions, seat functions, etc. These may be selectable by the driver or passengers via a touchscreen panel and various physical controls within the vehicle.

However, controlling these various functions and features in modern luxury vehicles often requires navigating complex menus or sub-menus through touchscreens and physical controls, leading to potential distractions and decreased driving focus. In particular, current implementations of physical controls and touchscreen menus and sub-menus fail to provide a seamless and intuitive way for users to personalize their driving experience.

It would be beneficial to address this issue by providing a convenient method for users to select and program desired functions by utilizing customizable physical buttons in the vehicle.

SUMMARY OF THE DESCRIPTION

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
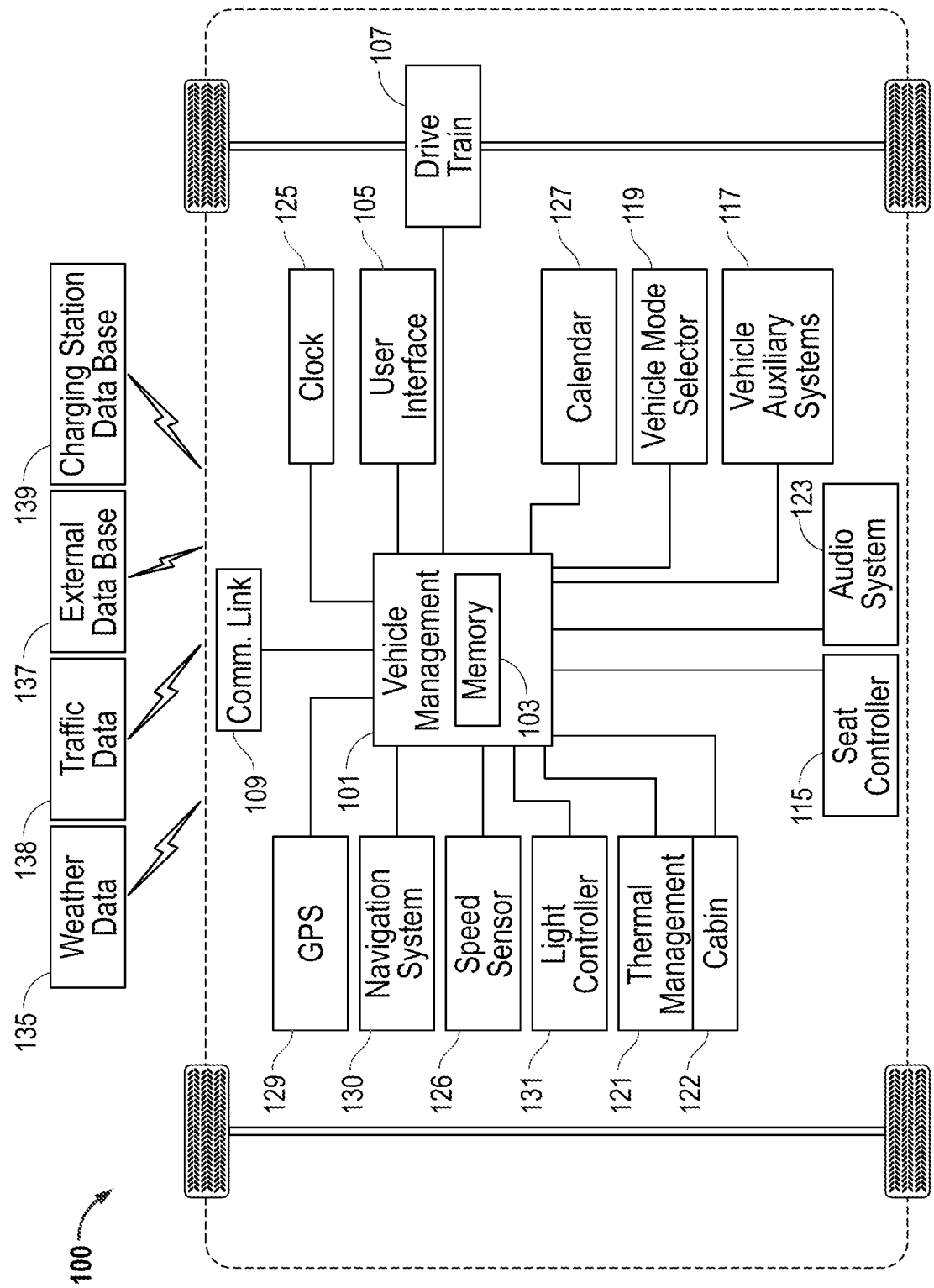
FIG. 1 illustrates system level diagram of a vehicle according to some embodiments of the disclosure.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" or "example" or "implementation" means that a particular feature, structure, or characteristic described in connection with the embodiment can be included in at least some embodiments of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure. The terms "electric vehicle" and "EV" may be used interchangeably and refer to an all-electric vehicle.

FIG. 1 is a high-level view of some embodiments of a vehicle 100. Vehicle 100 can be an electric vehicle (EV), a vehicle utilizing an internal combustion engine (ICE), or a hybrid vehicle, where a hybrid vehicle utilizes multiple sources of propulsion including an electric drive system. Vehicle 100 includes a vehicle on-board system controller 101, also referred to herein as a vehicle management system, which is comprised of a processor (e.g., a central processing unit (CPU)). System controller 101 also includes memory 103, with memory 103 being comprised of EPROM, EEPROM, flash memory, RAM, solid state drive, hard disk drive, or any other type of memory or combination of memory types. A user interface 105 is coupled to vehicle management system 101. Interface 105 allows the driver, or a passenger, to interact with the vehicle management system, for example inputting data into the navigation system 130, altering the heating, ventilation and air conditioning (HVAC) system via the thermal management system 121, controlling the vehicle's entertainment system (e.g., radio, CD/DVD player, etc.), adjusting vehicle settings (e.g., seat positions, light controls, etc.), and/or otherwise altering the functionality of vehicle 100. In at least some embodiments, user interface 105 also includes means for the vehicle management system to provide information to the driver and/or passenger, information such as a navigation map or driving instructions (e.g., via the navigation system 130 and GPS system 129) as well as the operating performance of any of a variety of vehicle systems (e.g., battery pack charge level for an EV, fuel level for an ICE-based or hybrid vehicle, selected gear, current entertainment system settings such as volume level and selected track information, external light settings, current vehicle speed (e.g., via speed sensor 126), current HVAC settings such as cabin temperature and/or fan settings, etc.) via the thermal management system 121. Interface 105 may also be used to warn the driver of a vehicle condition (e.g., low battery charge level or low fuel level) and/or communicate an operating system malfunction (battery system not charging properly, low oil pressure for an ICE-based vehicle, low tire air pressure, etc.). Vehicle 100 can also include other features like an internal clock 125 and a calendar 127.

In some embodiments, user interface 105 includes one or more interfaces including, for example, a front dashboard display (e.g., a cockpit display, etc.), a touch-screen display (e.g., a pilot panel, etc.), as well as a combination of various other user interfaces such as push-button switches, capacitive controls, capacitive switches, slide or toggle switches, gauges, display screens, warning lights, audible warning signals, etc. It should be appreciated that if user interface 105 includes a graphical display, controller 101 may also include a graphical processing unit (GPU), with the GPU being either separate from or contained on the same chip set as the processor.

Vehicle 100 also includes a drive train 107 that can include an internal combustion engine, one or more motors, or a combination of both. The vehicle's drive system can be mechanically coupled to the front axle/wheels, the rear axle/wheels, or both, and may utilize any of a variety of transmission types (e.g., single speed, multi-speed) and differential types (e.g., open, locked, limited slip).

Drivers often alter various vehicle settings, either when they first enter the car or while driving, in order to vary the car to match their physical characteristics, their driving style and/or their environmental preferences. System controller 101 monitors various vehicle functions that the driver may use to enhance the fit of the car to their own physical characteristics, such as seat position (e.g., seat position, seat height, seatback incline, lumbar support, seat cushion angle and seat cushion length) using seat controller 115 and steering wheel position using an auxiliary vehicle system controller 117. In some embodiments, system controller 101 also can monitor a driving mode selector 119 which is used to control performance characteristics of the vehicle (e.g., economy, sport, normal). In some embodiments, system controller 101 can also monitor suspension characteristics using auxiliary vehicle system 117, assuming that the suspension is user adjustable. In some embodiments, system controller 101 also monitors those aspects of the vehicle which are often varied by the user in order to match his or her environmental preferences for the cabin 122, for example setting the thermostat temperature or the recirculation controls of the thermal management system 121 that uses an HVAC controller, and/or setting the radio station/volume level of the audio system using controller 123, and/or setting the lights, either internal lighting or external lighting, using light controller 131. Also, besides using user-input and on-board sensors, system controller 101 can also use data received from an external on-line source that is coupled to the controller via communication link 109 (using, for example, GSM, EDGE, UMTS, CDMA, DECT, WiFi, WiMax, etc.). For example, in some embodiments, system controller 101 can receive weather information using an on-line weather service 135 or an on-line data base 137, traffic data 138 for traffic conditions for the navigation system 130, charging station locations from a charging station database 139, etc.

As an example, upon turning on the vehicle 100, in some embodiments, system controller 101 identifies the current driver (and go to their last pre-set functions) or just go the last pre-set functions for the vehicle (independent of who the current driver is), related to such features as: media functions, climate functions-heating, ventilation and air conditioning (HVAC) system, driving functions, seat positioning, steering wheel positioning, light control (e.g., internal lighting, external lighting, etc.), navigation functions, etc.

Embodiments relate to a method and apparatus for allowing a user in the vehicle to select a function and automatically implement the function by using a custom button. Embodiments relate to providing a user with the ability to assign specific functions to easily reachable physical buttons, enhancing convenience, reducing distractions, and empowering users to personalize their driving experience effortlessly. As will be described, a custom button can be provided as an accessible and convenient solution for users to access frequently-used functions, offering quick and convenient access to various features. Custom buttons may be provided on the steering wheel and/or on both ends of the pilot panel screen, and each custom button can be customized to perform a specific function according to the user's preferences. To personalize a custom button, a user can enter the customization mode with a single press or a press and hold the custom button in a pressed state for a predetermined period of time (e.g., a preset number of seconds, an indicator in the vehicle signals that the user has entered the custom button customization mode, until a menu (e.g., a slide-in menu, other types of menus, etc.) appears on a display screen (e.g., the pilot panel screen, a dashboard display, an auxiliary display, etc.)). Tapping the display screen (e.g., a pilot panel screen) allows a user to select a frequently-used function, which is saved to their profile. With this intuitive feature, drivers can effortlessly enhance convenience, minimize distractions, and tailor their driving experience through the custom buttons. Such innovations that result in safety advances as those set forth herein are difficult for traditional auto industry OEMs that operate simply as system's integrators, ordering and obtaining previously-designed, older parts from different suppliers and combining them together. Some of these older parts have been on the market for many years (e.g., 5 years) and were not developed with the user's UI experience or safety in mind. By developing the UI techniques disclosed herein in house, the UI experience can be optimized with the user in mind to provide the best UI experience while also taking into account safety in mind, which cannot be done with the system's integrator model employed by the traditional auto industry.

Note that for purposes herein, the techniques will be described with reference to a pilot panel display and a cockpit display. Even so, the techniques are not limited to a pilot panel-type displays and a cockpit-type dashboard display and can be employed with other types of internal vehicle and dashboard displays.

Figure 2:
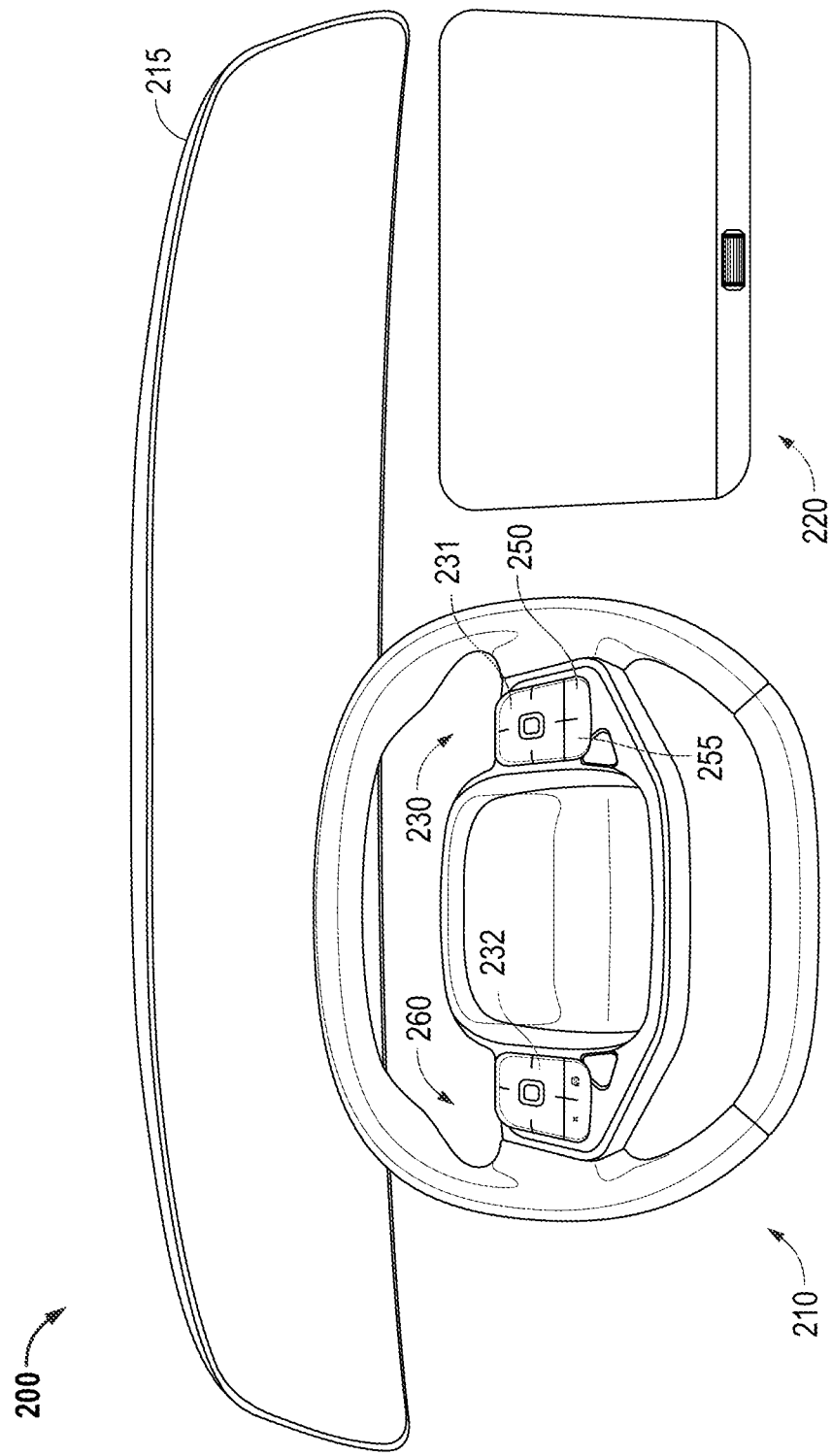
FIG. 2 illustrates a front view of portions of the interior of a vehicle that a driver may view including a wheel, a front cockpit display, and a pilot panel display according to some embodiments of the disclosure.

With brief reference to FIG. 2, FIG. 2 illustrates some embodiments of a front view 200 of portions of the interior of a vehicle that a driver may view including a wheel 210, a front cockpit display 215, and a pilot panel display 220. The wheel 210 includes a first steering wheel button control 230 and a second steering wheel button control 260. The first steering wheel button control 230 includes a custom button 250, a volume button 255, and a right capacitive controller 231 (to be described in more detail hereafter). Similarly, second steering wheel button control 260 includes a left capacitive controller 232 and two other buttons, as will be described in more detail hereafter.

Figure 3:
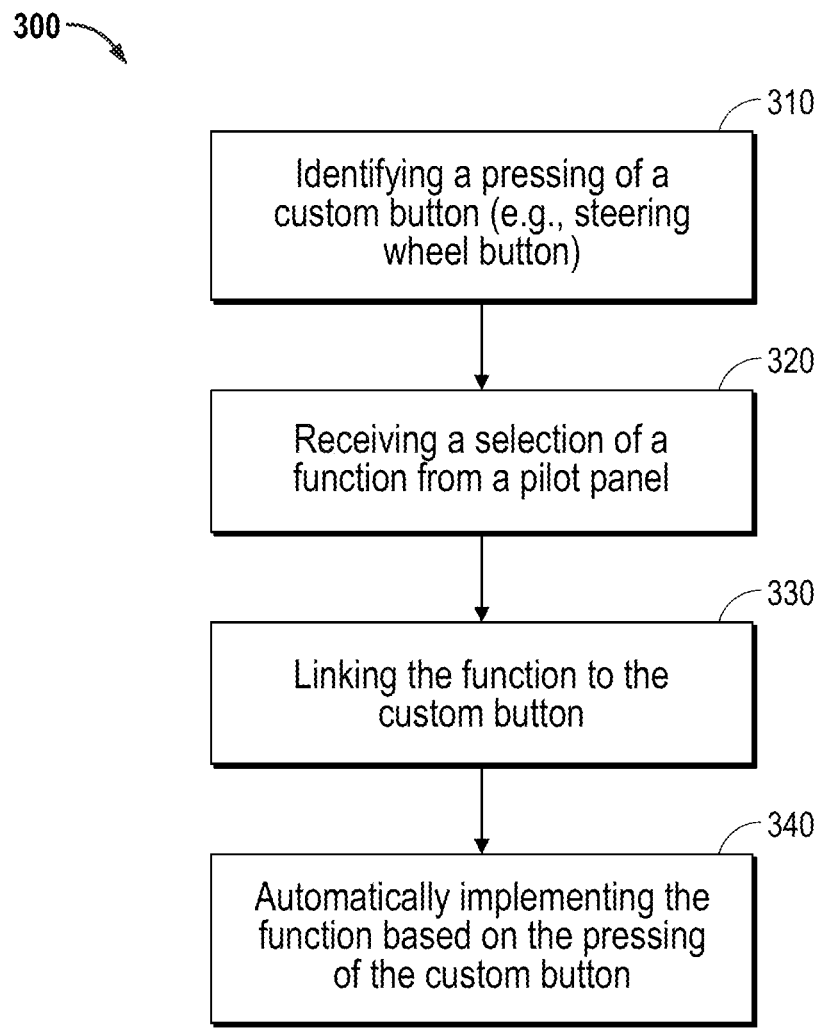
FIG. 3 is a flowchart of a process to implement a custom button according to some embodiments of the disclosure.

With brief reference to FIG. 3, FIG. 3 is a flowchart 300 describing some embodiments. As an example, with reference to FIG. 3, embodiments relate to a method of selecting and implementing a function selectable by a custom button by a user in a vehicle utilizing a system controller (e.g., system controller 101 including a processor and a memory). In some embodiments, the method comprises the operations of: identifying a pressing of a custom button (e.g., a custom button on a steering wheel, a custom button on an internal vehicle display (e.g., a touch panel, a pilot panel, etc.) (block 310); receiving a selection of a function from an internal vehicle display (e.g., a touch panel, a pilot panel, etc.) (block 320); linking the function to the custom button (block 330); and automatically implementing the function based on the pressing of the custom button so that future pressing of the custom button results in the performance of the function (block 340). As an example, in some embodiments, the custom button may be the custom button 250 on the first steering wheel button control 230 of the steering wheel 210. It should be appreciated that processor of the system controller 101 may implement these functions alone or in cooperation with the other system components of the vehicle 100 previously described in the description of FIG. 1.

Figure 4:
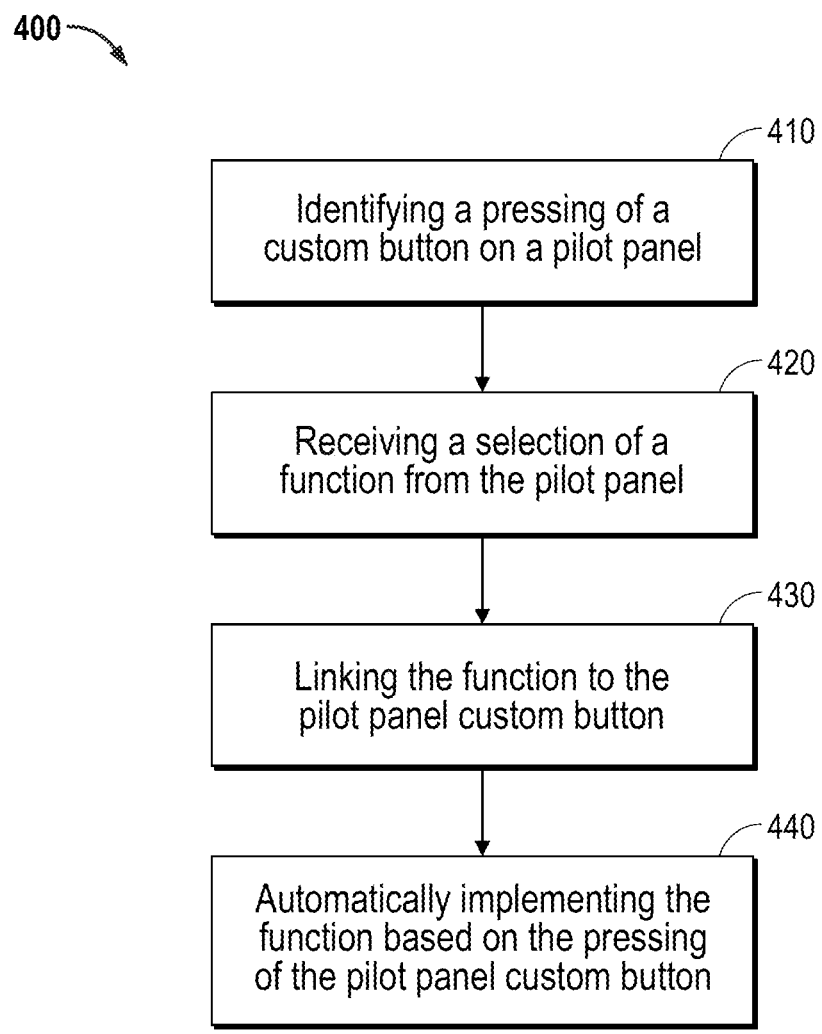
FIG. 4 is a flowchart of a process to implement a custom button according to some embodiments of the disclosure.

With brief reference to FIG. 4, FIG. 4 is a flowchart 400 describing some embodiments for customizing a custom button that is displayed on an internal vehicle display (e.g., a pilot panel). As an example, with reference to FIG. 4, embodiments relate to a method of selecting and implementing a function selectable by a custom button by a user in a vehicle, utilizing a system controller (e.g., system controller 101 including a processor and a memory). In some embodiments, the method comprises the operations of: identifying a pressing of a custom button on the pilot panel 220 (block 410); receiving a selection of a function from the pilot panel (block 420); linking the function to the pilot panel custom button (block 430); and automatically implementing the function based on the pressing of the pilot panel custom button (block 440). As an example, in some embodiments, the custom button is a pilot panel custom button on the pilot panel 220. In some embodiments, the processor of the system controller 101 can implement these functions alone or in cooperation with the other system components of the vehicle 100 previously described in the description of FIG. 1.

Figure 5:
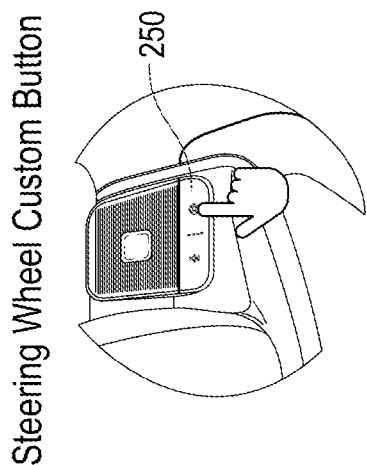
FIG. 5 illustrates an example of a driver pushing a custom button on the steering wheel to define a function according to some embodiments of the disclosure.
Figure 5:
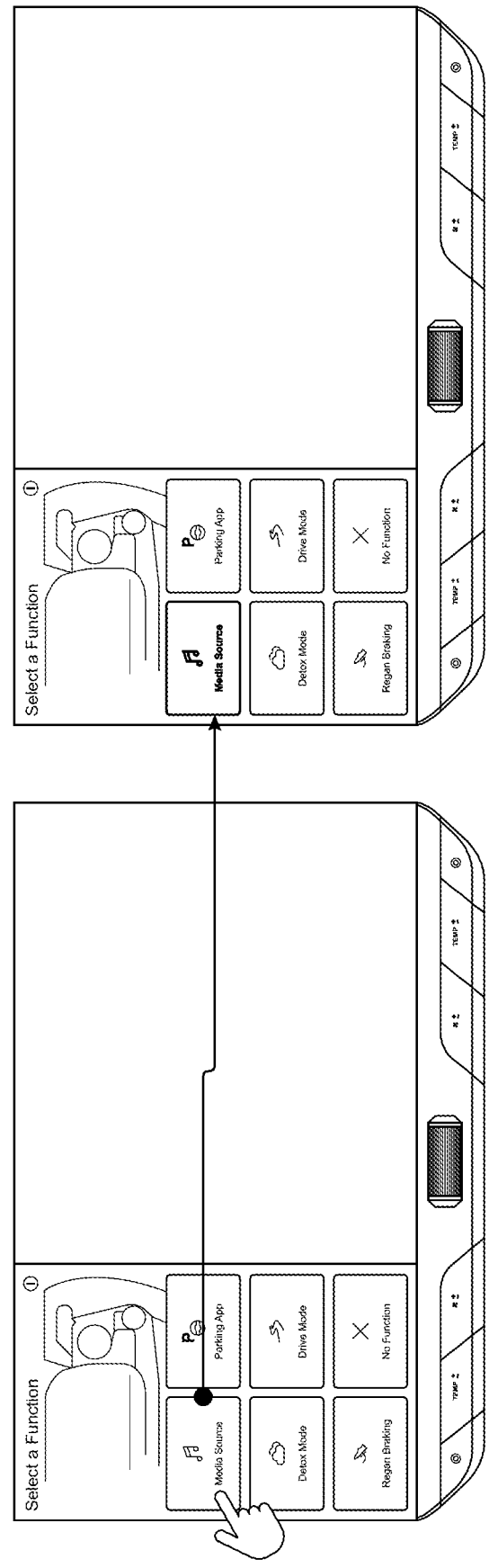

With brief reference to FIG. 5, FIG. 5 is an example of a user pushing the custom button 250 on the steering wheel 210 to define a function. In some embodiments, the steering wheel custom button 250 is configured on the steering wheel 210 (e.g., on the right-side steering wheel button control 230) to be accessible by a finger of the driver (e.g., user) while the driver's hand is on the steering wheel. In some embodiments, the steering wheel custom button 250 is accessible while driving the vehicle. In this example of FIG. 5, the steering wheel custom button 250 is pressed a single time (e.g., quick pressed and not held in a pressed state) for the first time, or initially by the user. When this occurs, and in response to the pressing, a variety of selectable functions appear on the pilot panel touch screen 220 that are selectable by the user. In one example, the following functions appear on the pilot panel touch screen 220: media source, detox mode, regen braking, parking app, drive mode, and no function. In one example, the user presses media source on the touch screen pilot panel 220. In this example, media source designates the next available media source (e.g., a music station). Therefore, based on the steering wheel custom button 250 being single (quick) pressed for the first time by the user and the user selecting the media source from the pilot panel 220 (e.g., by finger pressing media source button on the touch-screen pilot panel 220), the processor of the system controller 101 links the media source function to the steering wheel custom button 250, such that, when the user subsequently performs a single press of the steering wheel custom button 250, the media source function is automatically implemented, or otherwise performed. It should be appreciated that use could have selected any of the functions appearing on the pilot panel touch screen 220 by pressing on them on the pilot panel touch screen 220: media source, detox mode, regen braking, parking app, drive mode, or no function; for automatic linkage and then automatic implementation when the steering wheel custom button 250 is again pressed a single time (e.g., quick pressed and not held in a pressed state).

On the other hand, when the steering wheel custom button 250 is held and pressed by the user for a predetermined period of time (e.g., not quick pressed—the button is held for a few seconds until the slide in menu on the pilot panel touch screen 220 appears), based on the press and hold, again a variety of selectable functions appear on the pilot panel touch screen 220 that are selectable by the user as shown in FIG. 5. In this example, the following functions appear on the pilot panel touch screen 220: media source, detox mode, regen braking, parking app, drive mode, and no function; and any of them can be selected by the user by pressing on them on the touch screen pilot panel 220. Continuing with the FIG. 5 example, the user presses media source on the touch screen pilot panel 220. In this example, media source designates the next available media source (e.g., a music station). Therefore, based on the steering wheel custom button 250 being held and pressed by the user and the user selecting the media source from the pilot panel 220, the processor of the system controller 101 links the media source function to the steering wheel custom button 250, such that, when the user subsequently single (quick) presses the steering wheel custom button 250, the media source function is automatically implemented. It should be appreciated that user could have selected any of the functions appearing on the pilot panel touch screen 220: media source, detox mode, regen braking, parking app, drive mode, or no function; for automatic linkage and then automatic implementation when the steering wheel custom button 250 is again pressed a single time (quick pressed and not held in a pressed state).

Figure 6:
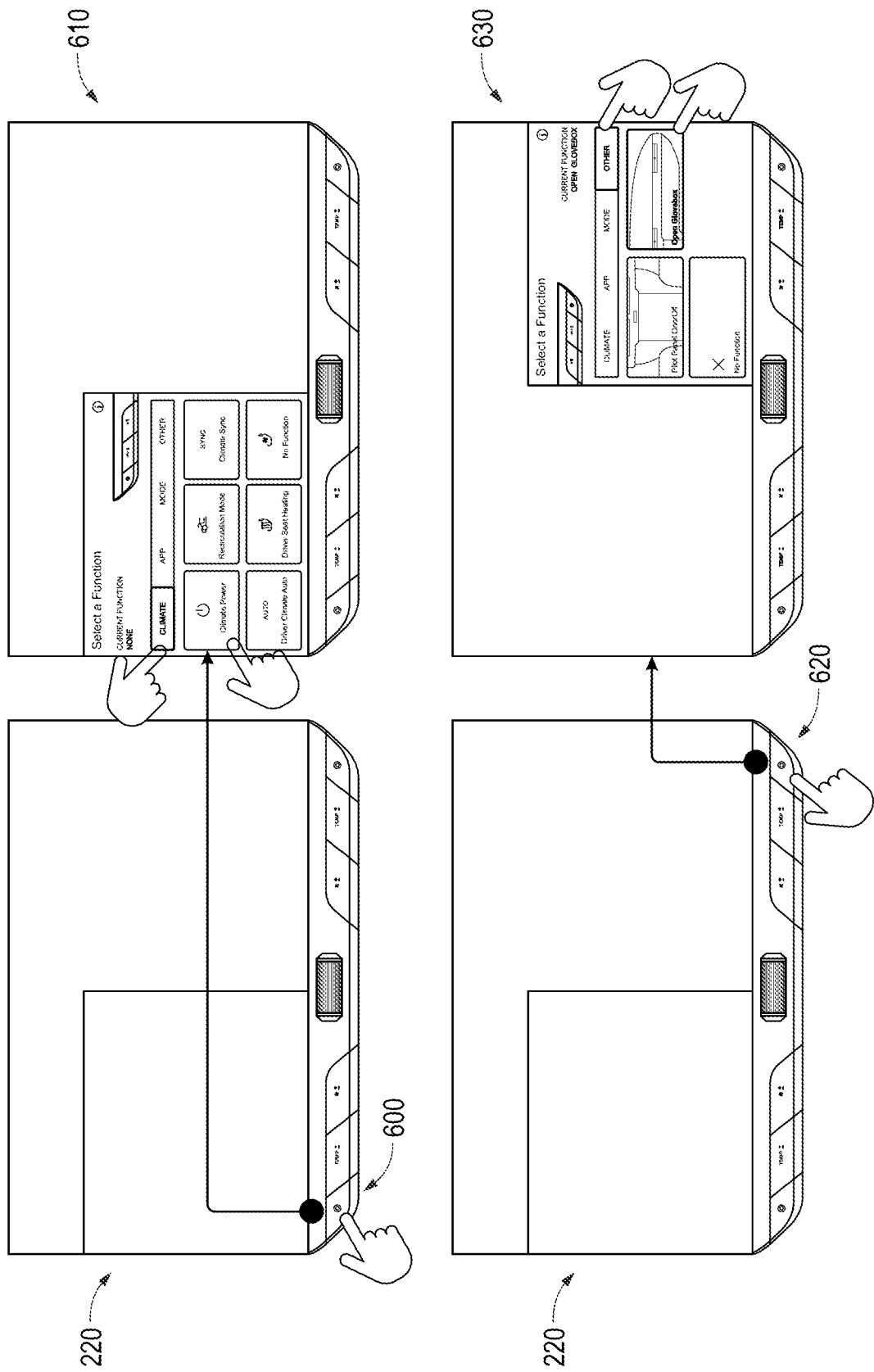
FIG. 6 illustrates an example of a user pushing a pilot panel custom button on the pilot panel to define a function according to some embodiments of the disclosure.

With brief reference to FIG. 6, FIG. 6 is an example of a user pushing a pilot panel custom button 600 on the pilot panel 220 to define a function. It should be noted that, in one example, there may be two pilot panel custom buttons on both the left-side and right-side of the pilot panel. When the left-side pilot panel button 600 is pressed a single time (quick pressed and not held in a pressed state) for a first time by the user, a function from the pilot panel is selectable by the user and can be linked to the pilot panel button, such that, when the user subsequently single (quick) presses the pilot panel button, the function is automatically implemented. As a first example, with reference to scenario 610, a pilot panel custom button 600 on the pilot panel 220 is single (quick) pressed for a first time by the user. Based upon this, a variety of selectable functions appear on the pilot panel touch screen 220 that are selectable by the user. In this example, the following functions appear on the pilot panel touch screen 220: climate, application, mode, and other. In the climate functions the following functions are further selectable (by the user touching the pilot panel touch screen): climate power, recirculation mode, climate sync, driver climate auto, driver seat heating, or no function. In this example, the user first selected climate by touching their finger on climate and then climate power by touching their finger on climate power on the touch screen pilot panel 220. Therefore, based on the user pressing the pilot panel custom button 600 a single time (e.g., single quick pressing) initially and selecting climate power from the pilot panel 220, the processor of the system controller 101 links the climate power function to the left-hand side pilot panel custom button 600, such that, when the user subsequently single (quick) presses that left-hand side pilot panel custom button 600, the climate power (e.g., associated with the thermal management system 121) is automatically implemented.

It should be appreciated that the user could have selected any of the functions appearing on the pilot panel touch screen 220 by pressing on them related to: climate, application, mode, or other. Further, under the climate selection, the user could have selected any of the functions: climate power, recirculation mode, climate sync, driver climate auto, driver seat heating, or no function; for automatic linkage and then automatic implementation occurs when the left-hand sided pilot panel custom button 600 is quick pushed (not held in the pressed state).

On the other hand, when the left-hand side pilot panel custom button 600 is pressed and held in the pressed state by the user (e.g., not quick pressed—the button is held for a few seconds until the slide in menu on the pilot panel touch screen 220 appears), based on the hold and press, again a variety of selectable functions appear on the pilot panel touch screen 220 that are selectable by the user as shown in FIG. 6. Based upon this, a variety of selectable functions appear on the pilot panel touch screen 220 that are selectable by the user. In this example, the following functions appear on the pilot panel touch screen 220: climate, application, mode, and other. If the user selects climate on the touchscreen (by touching), the following climate functions are further selectable: climate power, recirculation mode, climate sync, driver climate auto, driver seat heating, or no function. In this example, the user selects climate power by touching their finger on climate power on the touch screen pilot panel 220. Therefore, based on the user pressing and holding the pilot panel custom button 600 and selecting climate and climate power on the touch-screen of the pilot panel 220, the processor of the system controller 101 links the climate power function to that left-hand sided pilot panel custom button 600, such that, when the user subsequently presses left-hand side pilot panel custom button 600 a single time (single quick presses), the climate power (e.g., associated with the thermal management system 121) is automatically implemented.

It should be appreciated that use could have selected any of the functions appearing on the pilot panel touch screen 220 by touching them on the pilot panel touch screen 220: climate, application, mode, or other. Further, upon selecting climate, the user can select any of the following function by touching the pilot panel touch screen: climate power, recirculation mode, climate sync, driver climate auto, driver seat heating, or no function; for automatic linkage and then automatic implementation will occur when the left-hand sided pilot panel custom button 600 is quick pushed by the user.

Further, it should be noted that there are two pilot panel custom buttons a left-side pilot panel custom button 600 (previously described) and a right-side pilot panel custom button 620. As shown in scenario 630 of FIG. 6, as with scenario 610, right-side pilot panel button 620 may be used in the same way as the left-side pilot panel button 600 as to: a first time quick press for a selection of a function from the touch-screen pilot panel 220, or a press and hold the button in a pressed state for a selection of a function from the touch-screen pilot panel 220. As a brief example, with reference to scenario 630, right-side pilot panel button 620 is single quick pressed for a first time by the user or held and pressed by the user. Based upon this, a variety of selectable functions appear on the pilot panel touch screen 220 that are selectable by the user. In this example, in scenario 630, the following functions appear on the pilot panel touch screen 220: climate, application, mode, and other. In this example, the user selects the other function by touching the pilot panel touch screen 220, such that the following functions are further selectable: pilot panel on or off, open glove box, or no function. In this example, the user further selects open glove box by pushing their finger on open glove box on the touch screen pilot panel 220. Therefore, based on the user pressing the right-side pilot panel button 620 a single time (e.g., single quick pressing) initially (for the first time) or press and holding the right-side pilot panel button 620 and selecting the other function and open glove box function from the pilot panel touch screen 220, the processor of the system controller 101 links the open glove box function to the right-side pilot panel custom button 620, such that, when the user subsequently single (quick) presses the right-side pilot panel custom button 620, the open glove box function is automatically implemented.

It should be appreciated that using the right-side pilot panel custom button 620 the user could have selected any of the functions appearing on the pilot panel touch screen 220 by pressing on them on the pilot panel touch screen 220: climate, application, mode, or other—and, thereafter, any of the any of the available associated functions associated with those functions; for automatic linkage and then automatic implementation when the right-side pilot panel custom button 620 is quick pushed.

Therefore, with the use of a left-side pilot panel custom button 600 and right-side pilot panel custom button 620 on the pilot panel 220, in conjunction, with the steering wheel custom button 250, many specific functions can be easily selected by the driver or the passenger on the steering wheel 210 or pilot panel 220 for subsequent automatic implementation by simply quick pressing the steering wheel custom button 250 on the wheel or by simply quick pressing the left-side pilot panel custom button 600 or right-side pilot panel custom button 620 on the pilot panel 220. In some example embodiments, the left-side pilot panel custom button 600 and the right-side pilot panel custom button 620 may be up/down buttons that have two positions. Therefore, left-side pilot panel custom button 600 can first define a function, as previously described, in a single press up or a single press down and re-define a function, as previously described, in a press up and hold or a press down and hold. Similarly, right-side pilot panel custom button 620 can first define a function, as previously described, in a single press up or a single press down and re-define a function, as previously described, in a press up and hold or a press down and hold. This permits even more functions to be pre-defined for simply quick pressing by the left-side and right-side pilot panel custom buttons 600 and 620.

As has been described, the system controller 101 of the vehicle in cooperation with other previously described components of the vehicle can implement a method of selecting and implementing a function selectable by one or both of the custom buttons. As has been described, a processor of the system controller 101 can implement functions including: identifying a pressing of a custom button by a user (e.g., steering wheel custom button 250, left-side pilot panel custom button 600, or right-side pilot panel custom button 620) (e.g., single press or press and hold); receiving a selection of a function from a pilot panel 220 by the user touching the touch screen pilot panel 220 to select the function; linking the function to the custom button; and then automatically implementing the function when the custom button is subsequently pressed in the future.

Figure 7:
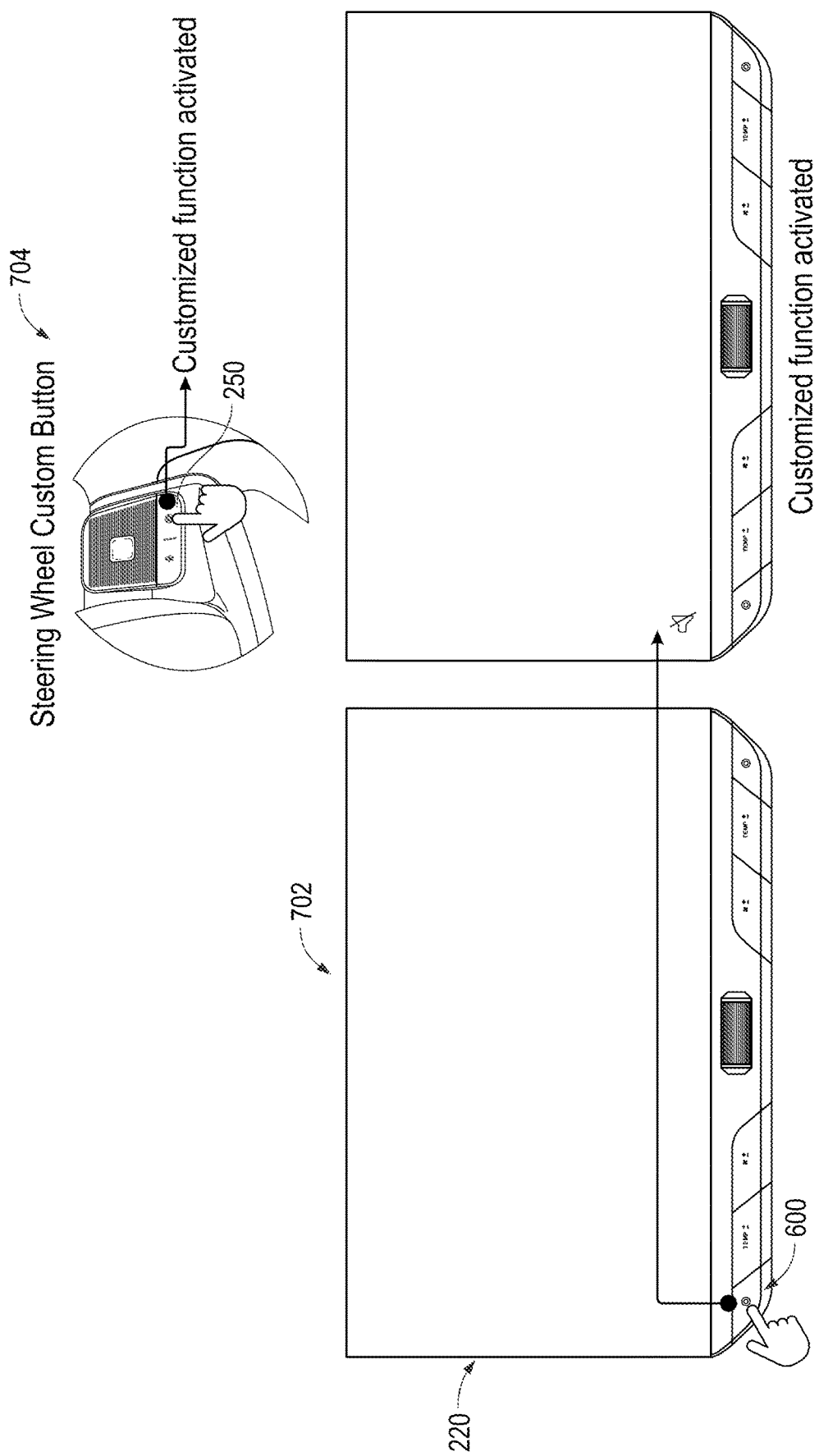
FIG. 7 illustrates an example of a driver or user single pressing a custom button to automatically implement a function according to some embodiments of the disclosure.

As an example, with reference to FIG. 7, as has been described, after the custom buttons for the pilot panel and the steering wheel have been defined, single presses will automatically implement the function. As a first example, with reference to scenario 702, left-side pilot panel custom button 600 is single pressed and the customized function is automatically implemented (e.g., mute). As a second example, with reference to scenario 704, steering wheel custom button 250 is single pressed and the customized function is automatically implemented.

It should be appreciated that a wide variety of functions have been described that may be pre-selected by a user and then automatically implemented by a quick single press of the steering wheel custom button or one of the pilot panel custom buttons (without holding them button in a pressed state). These functions previously described may be related to: media functions, navigation functions, parking functions, driving functions, braking functions, climate functions, application functions, mode functions, or other functions. Further type of functions may include: media source, detox mode, drive mode, regen braking, no function, climate power, recirculation mode, climate synch, driver climate auto, driver seat heating, driver seat cooling, pilot panel on or off, open glove box, etc. Media functions, navigation functions, thermal management functions (e.g., heating, ventilation and air conditioning (HVAC) system)), driving functions, seat positioning functions, steering wheel positioning functions, light control functions (e.g., internal lighting, external lighting, etc.), as well as other functions, may be implemented under the control of the processor of the system controller 100 along with other components previously described, such as: vehicle mode selector 119, audio system 123, seat controller 115, thermal management system 121, light controller 131, navigation system 130, or GPS 129. Further, it should be appreciated that a user interface 105 may include the steering wheel custom button, left-side pilot panel custom button, right-side pilot panel custom button, inputs from the touch screen pilot panel, and or any type of input from any screen, button, etc. These inputs can be processed by the system controller 101. The previously described functions, or only example functions, and it should be appreciated that any type of function associated with a vehicle may utilized with respect to embodiments described herein.

As has been described, embodiments relate to providing a user with the ability to assign specific functions to easily reachable physical buttons, enhancing convenience, reducing distractions, and empowering users to personalize their driving experience effortlessly. The custom buttons previously described are accessible and convenient solutions for users to access frequently-used functions, offering quick and convenient access to various features. These custom buttons, as previously described, may be provided on the steering wheel and on both ends of the pilot panel screen, and each custom button can be customized to perform a specific function according to the user's preferences. To personalize a custom button, a user can enter the customization mode with a single press or a press and hold until a slide-in menu appears on the pilot panel screen and the user can select on the pilot panel touch screen.

Capacitive Controllers

In some embodiments, capacitive controllers may be utilized to allow the driver to scroll through functions and select functions with one hand and a single finger (e.g., the thumb), while driving. With brief reference to FIG. 2, FIG. 2 is front view 200 of portions of the interior of a vehicle that a driver may view including a wheel 210, a front cockpit display 215, and a pilot panel display 220. The wheel 210 includes a right steering wheel button control 230 and a left steering wheel button control 260. The right steering wheel button control 230 includes the custom button 250 (previously described), a volume button 255, and a right capacitive controller 231 (above the custom and volume buttons—to be described in more detail hereafter). Similarly, left steering wheel button control 260 includes a cancel button and a single press button next to it (e.g., to set activate HVAC, speed control, etc.), and a left capacitive controller 232 (above the two buttons—to be described in more detail hereafter). In some embodiments, the system controller 103 of FIG. 1 receives inputs from the right capacitive controller 231 and the left capacitive controller 232 and converts those inputs to actions taken with respect to content that is being displayed on the front cockpit display 215 and the pilot panel display 220, as well as other actions implemented or otherwise performed by appropriate vehicle systems and functionality.

Figure 8:
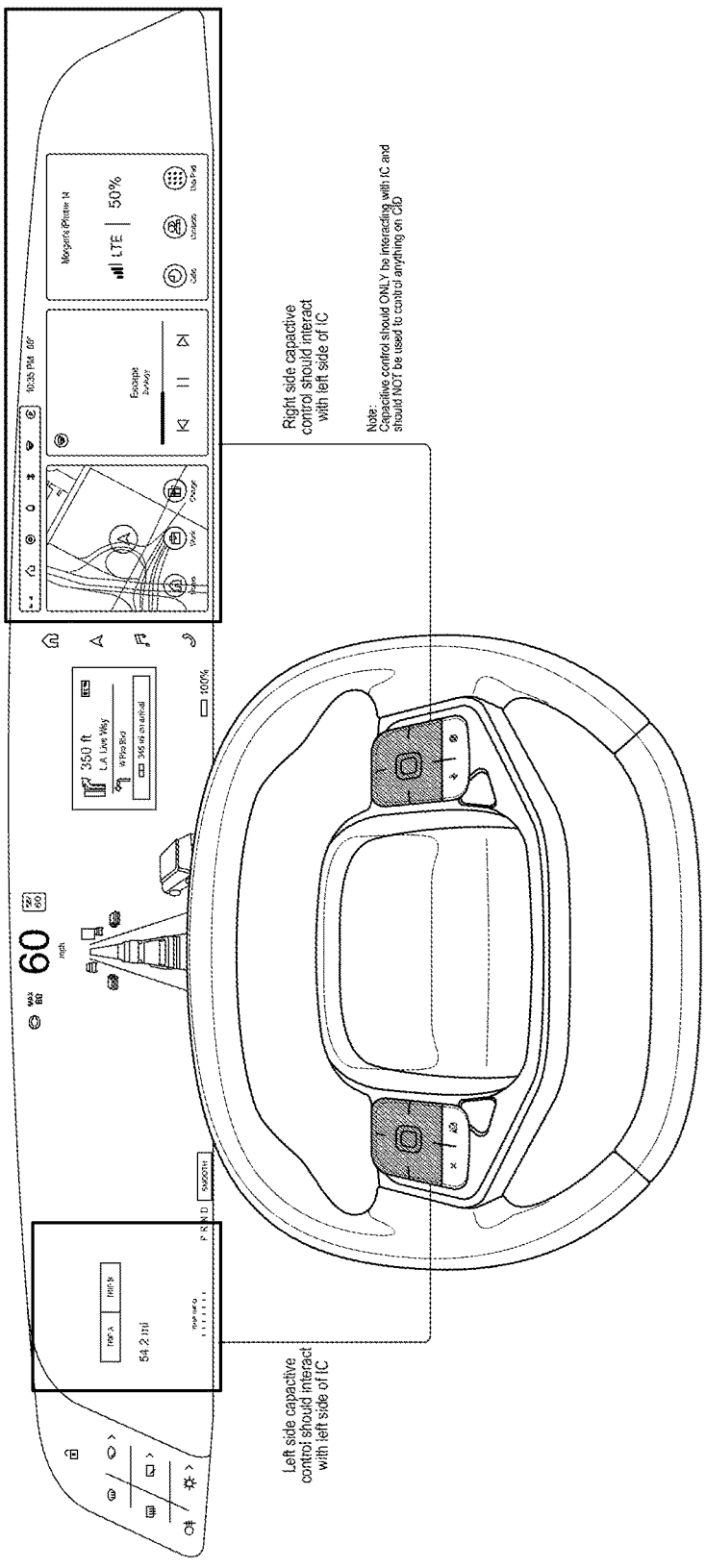
FIG. 8 illustrates right and left and capacitive controllers in more detail and how they interact with a cockpit display according to some embodiments of the disclosure.

Turning to FIG. 8, FIG. 8 shows the right and left and capacitive controllers in more detail and how they interact with the cockpit display in accordance with some embodiments. In some embodiments, the right capacitive controller only interacts with right side of the information center (IC) cockpit display, and the left side capacitive controller only interacts with left side of the information center (IC) cockpit display. In some embodiments, neither of the capacitive controllers interact with the center information display (CID) of the cockpit display. As can be seen in FIG. 8, the right IC can display information related to navigation, media, phone service, and data; the left IC can display information related to trip information; and the CID may display information related to speed and driving information. As will be described in more detail, in some embodiments, the right capacitive controller will interact with right side of the information center (IC) cockpit display to scroll through and select features related to: media, radio, messages, voice calls, data, car control, etc. Further, as will be described in more detail, in some embodiments, the left capacitive controller interacts with left side of the information center (IC) cockpit display to scroll through and select features related to: driving assistance (e.g., trip information, speed setting, adaptive cruise control (ACC), HWA, etc.).

In some embodiments, the right capacitive controller can be utilized to allow the user to scroll through the previously described functions and select these functions on the right IC with one hand and a single finger (e.g., the thumb) while the user's hands are on, or proximate to, the steering wheel (e.g., while driving), whereas, the left capacitive controller may be utilized to allow the user to scroll through the previously described functions and select functions on the left IC with one hand and a single finger (e.g., the thumb) while the user's hands are on, or proximate to, the steering wheel (e.g., while driving). However, in some embodiments, the right and left ICs may also be touch-screen such that the driver can touch functions to select them to add additional selection availability.

It has been found in prior art implementations that controlling various functions by a driver of a vehicle often requires navigating complex menus or sub-menus through touchscreens and physical controls, leading to potential distractions and decreased driving focus. As an example of prior art implementations, the driver having to go back and forth between buttons, touch-screens and the steering wheel makes interactions very difficult and counter-intuitive. As an example of prior art implementations, a driver often has to go to a touch-screen to switch to a different desired application function through various tab selections, and, oftentimes, is not able to switch to the desired application function. These prior art interaction techniques are very distracting to the driver.

Embodiments relates to capacitive controllers on the steering wheel that may be utilized to allow the user to scroll through functions and select functions with one hand and a single finger (e.g., the thumb) on the front cockpit display right in front of them while the user's hands are on, or proximate to, the steering wheel (e.g., while driving). This increases vehicle safety, by keeping the driver's hands on the wheel. It has been found that capacitive controllers on the steering wheel to interact with the front cockpit display right in front of the driver provides very effortless interactions for the driver. For example, as will be described, frequently used functions may be completed quickly and with very little effort, while the driver keeps their hands on the steering wheel. As will be described, the right and left capacitive controllers as they interact with right and left IC cockpit displays involve contextual mapping, such that the driver can swipe left, right, up, down, to reach desired functions and then select them. As will be described, selection of a function can occur by a center press of the capacitive controller (e.g., in the middle of the capacitive controller) by the driver (e.g., such that it is an intentional selection by the driver). In some embodiments, the left and right capacitive controllers are capacitive sensors that include capacitive film to measure the swiping of the driver's finger. However, any electronic device to perform these functions may be used. As will be described, the most frequently used features by the driver can be easily searched for and selected by swiping on the capacitive controller with one finger. These common features include at least common functions, such as: media, navigation, phone, data, etc. It should be appreciated that these interactions, such as, selecting media sources (e.g., music channel), answering a phone call, etc., are very familiar to how drivers interact with other devices (e.g., smart phones).

Various rulesets may be associated with the capacitive controllers. For example, the capacitive controllers may minimize false positive actions (e.g., avoid using small-movement input to prevent unintentional touch and disable capacitive input when the steering wheel is over a predetermined angle). Further, in some embodiments, the capacitive controllers can disable or ignore capacitive input under certain conditions, such as: steering wheel rotation being over a predetermined degree; when a user's hand touches the capacitive controller for more than a predetermined amount of time (in which case, steering wheel capacitive input should be ignored unit the next touch event); and a user should be able to turn off capacitive control from system settings. Additionally, in some embodiments, preemptive tasks are always given highest priority. For example, other capacitive control on the same side should not apply until the preemptive task is dealt with. Also, in some embodiments, when a preemptive task occurs, capacitive input for the capacitive controller is disabled/ignored for a predetermined amount of time to prevent accidental response to a preemptive task due to context switching. Further, as will be described, application shortcuts have a preset ruleset.

As to application switching, a driver should be able to quickly go the previous/next application by swiping up/down on the right capacitive controller of the steering wheel. Further, each application can have a list of short cuts that can be displayed in tiles that can represent the most common/frequently used cases. Also, shortcuts can be triggered by swiping right on the right capacitive controller of the steering wheel when on a supported application.

Figure 9:
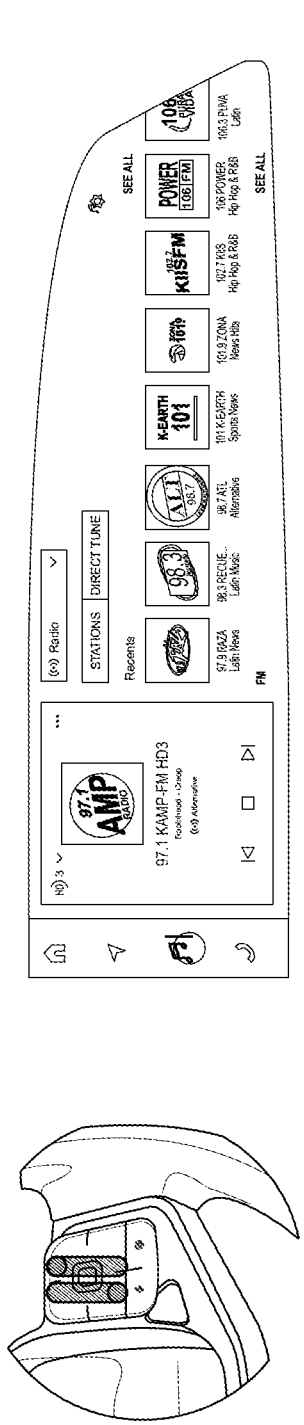
FIG. 9 illustrates a scroll mode according to some embodiments of the disclosure.

With reference to FIG. 9, a scroll mode will be described. As shown in FIG. 9, in scroll mode, the driver may swipe up/down on the right capacitive controller of the steering wheel for browsing different content areas. In the example, various radio stations are shown.

Figure 10:
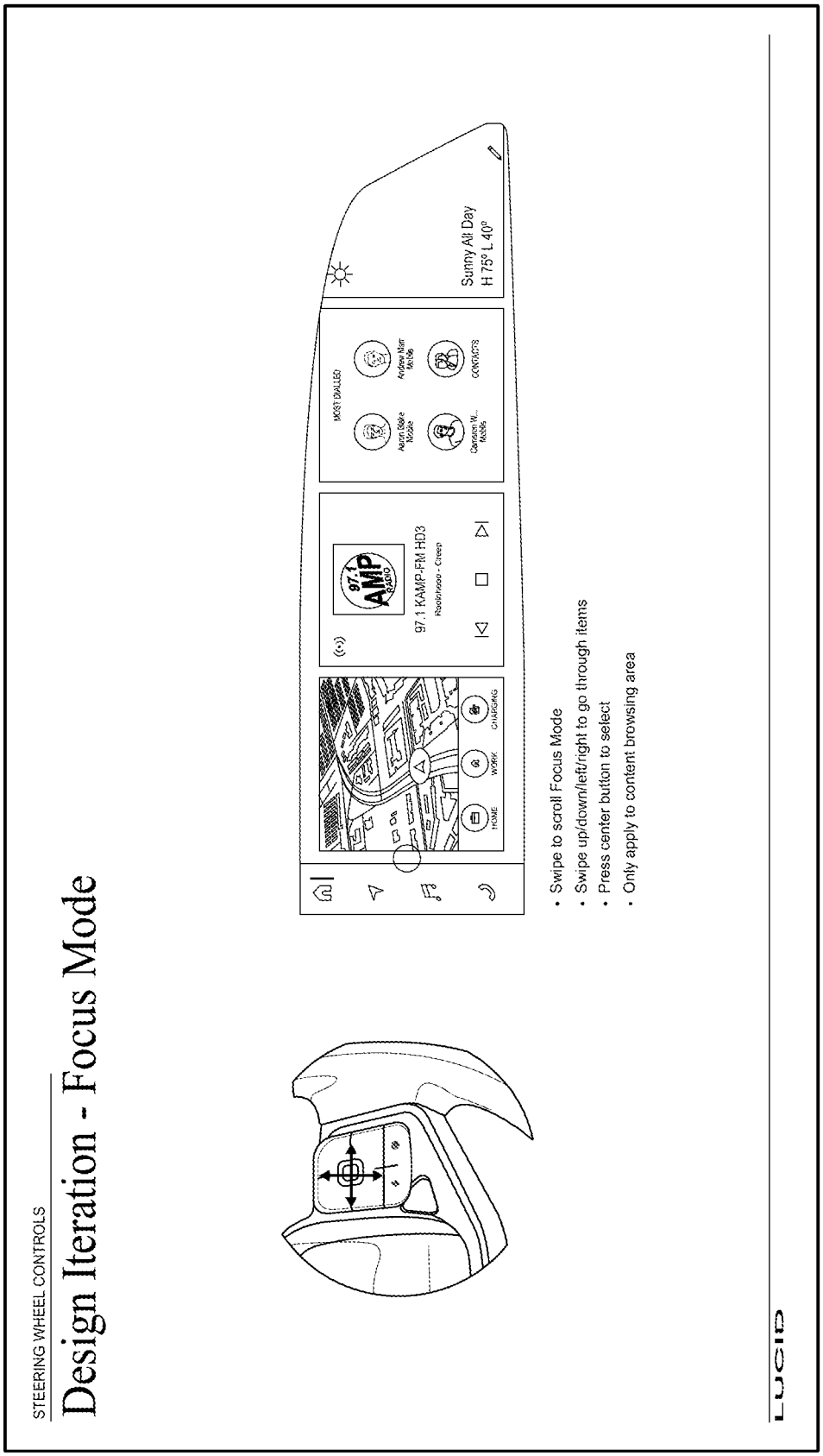
FIG. 10 illustrates a focus mode according to some embodiments of the disclosure.

With reference to FIG. 10, a focus mode will be described. To enter focus mode, the driver may do a full swipe (e.g., up/down) on the right capacitive controller of the steering wheel. The driver may then swipe (up/down/left/right) to go through all of the various selectable items as shown on the right IC display. As shown in FIG. 10 these items may include:

navigation, media (e.g., radio), voice calls (e.g., most dialed), data input (e.g., weather), etc., as shown on the right IC display. In particular, the driver, utilizing their finger can swipe on the right capacitive controller to the desired item and press the center button/portion of the right capacitive controller to activate/implement the application item desired (e.g., music, phone call, navigation, data (e.g., weather), etc.). It should be appreciated that the driver may utilize the left capacitive controller of the steering wheel for swiping (up/down/left/right) to go through all of the various selectable items as shown on the left IC display and press the center button/portion of the left capacitive controller to activate/implement the item desired (e.g., trip information, speed setting, adaptive cruise control (ACC), HWA, etc.). However, any electronic device to perform these functions may be used.

Various other examples will be hereafter described.

Figure 11:
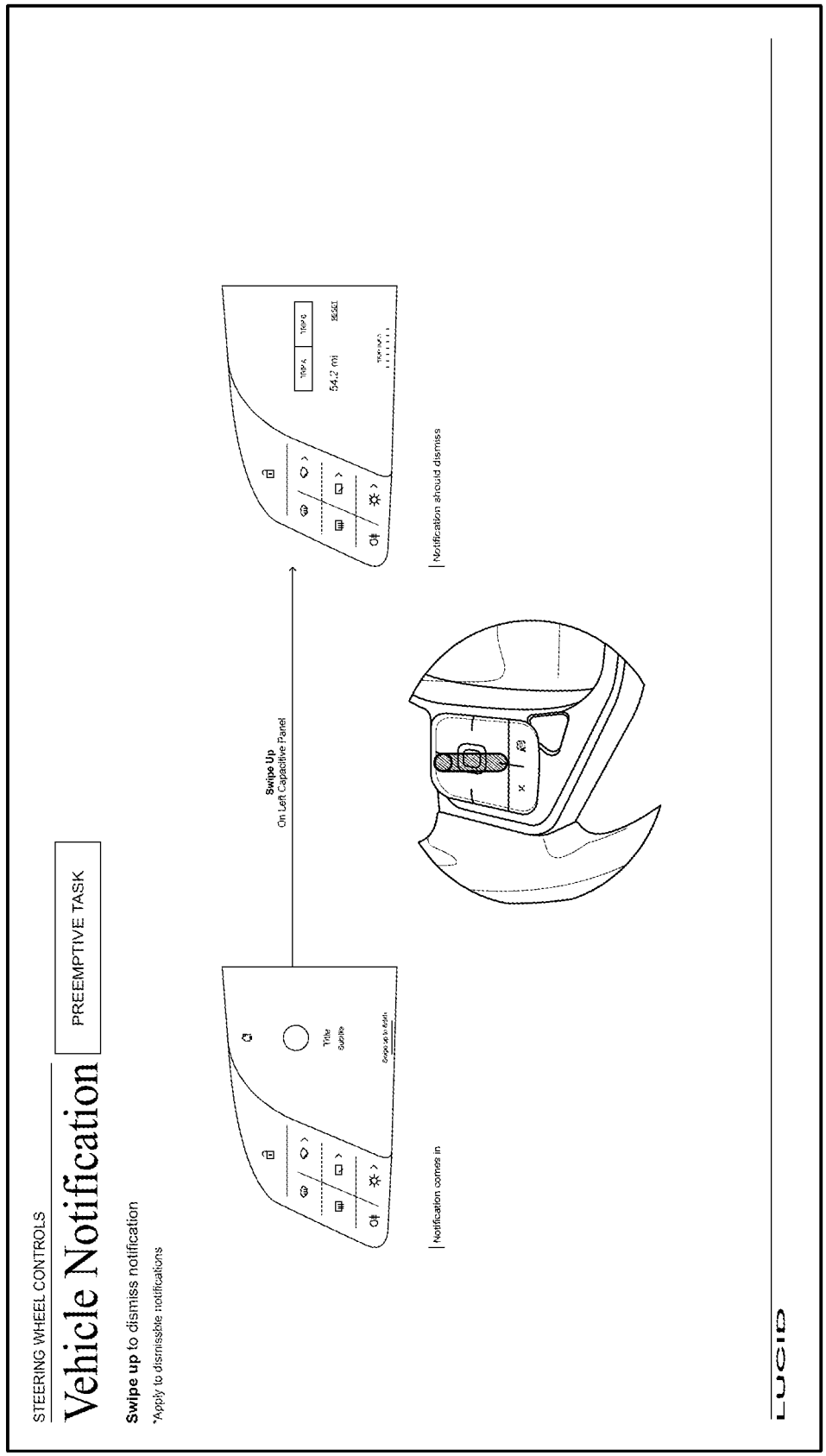
FIG. 11 illustrates a vehicle notification according to some embodiments of the disclosure.

With reference to FIG. 11, a vehicle notification will be described. As shown in FIG. 11, a vehicle notification is provided to the driver that is a preemptive task. The driver can then swipe up on the left capacitive controller of the steering wheel to dismiss the notification to return to the previous display (e.g., trip description) on the left IC display.

Figure 12:
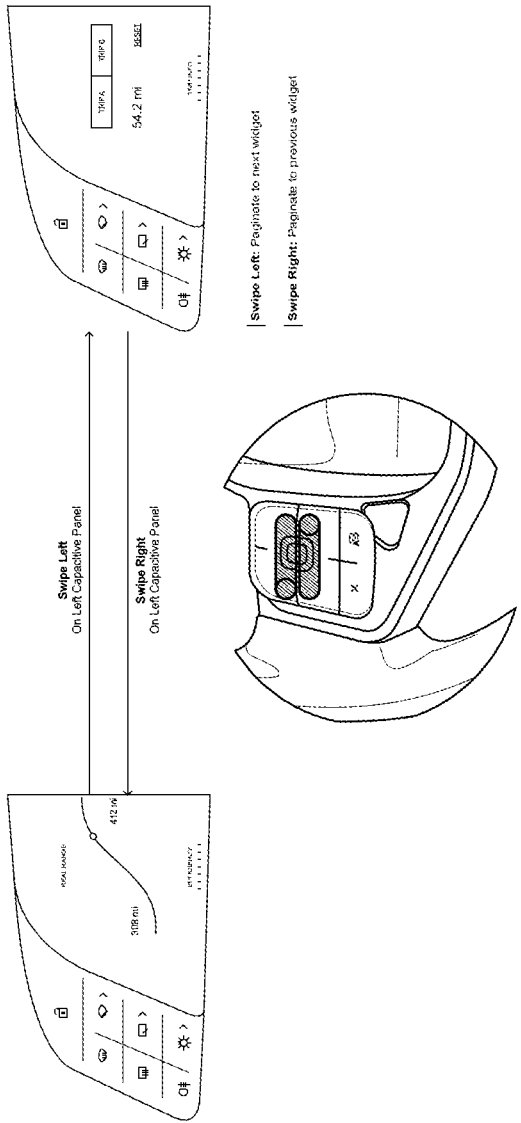
FIG. 12 illustrates browsing different content on a display according to some embodiments of the disclosure.

With reference to FIG. 12, browsing different content on the left IC display will be described. As shown in FIG. 12, a driver may swipe left/right on the left capacitive controller of the steering wheel to browse/paginate through content (e.g., different widgets) on the left IC display. As shown in this example, in some embodiments, the driver may browse through a trip information widget and energy efficiency information widget by swiping. As an example, swiping left paginates to the next widget and swiping right paginates to the previous widget.

Figure 13:
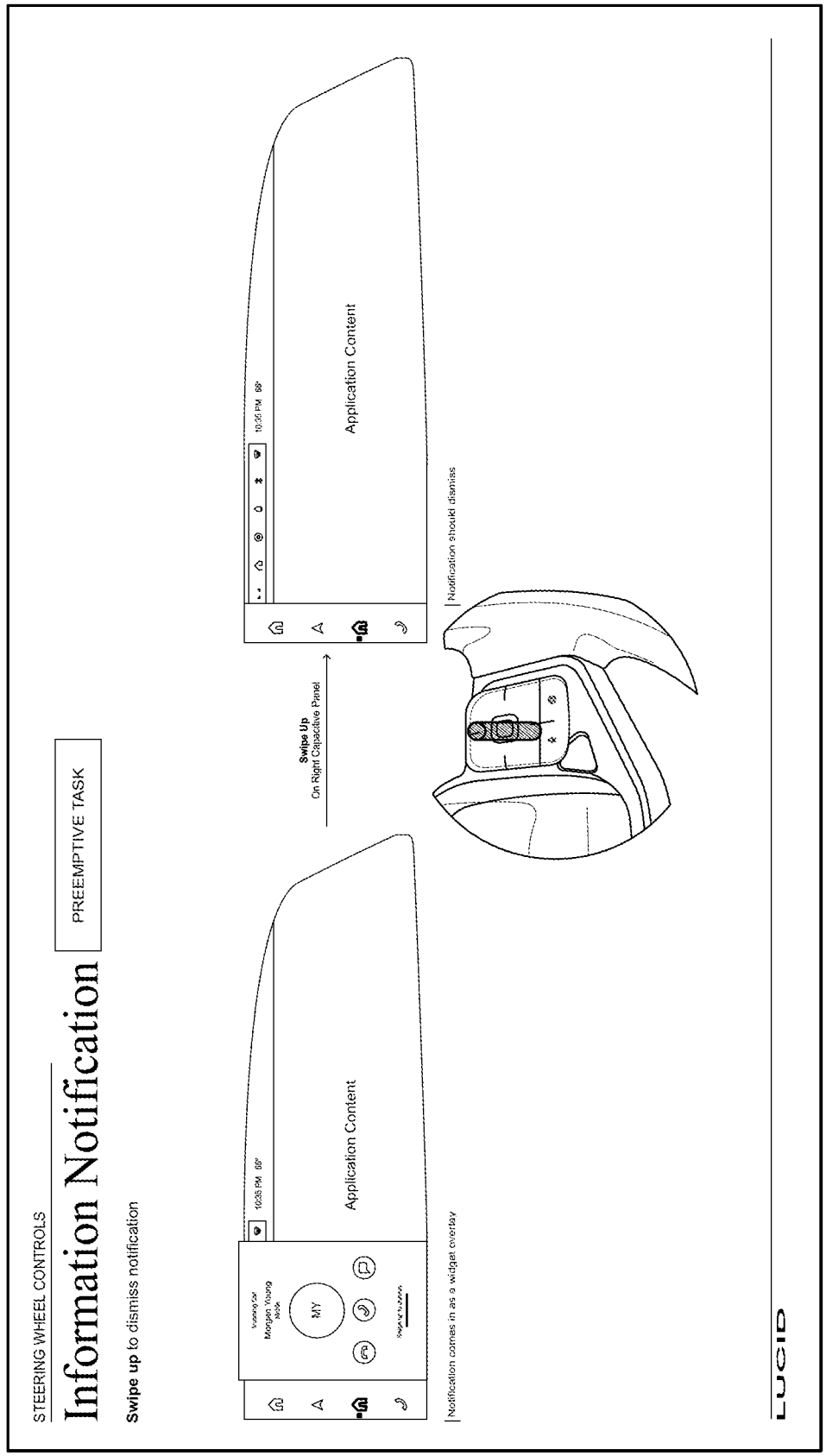
FIG. 13 illustrates an infotainment notification according to some embodiments of the disclosure.

With reference to FIG. 13, an infotainment notification will be described. As shown in FIG. 13, the infotainment notification is provided to the driver that is a preemptive task. In this example, the infotainment notification may be a mobile call coming in as a widget overlay. In some embodiments, the driver may then swipe up on the right capacitive controller of the steering wheel to dismiss the mobile call to return to the previous application display on the right IC display.

Figure 14:
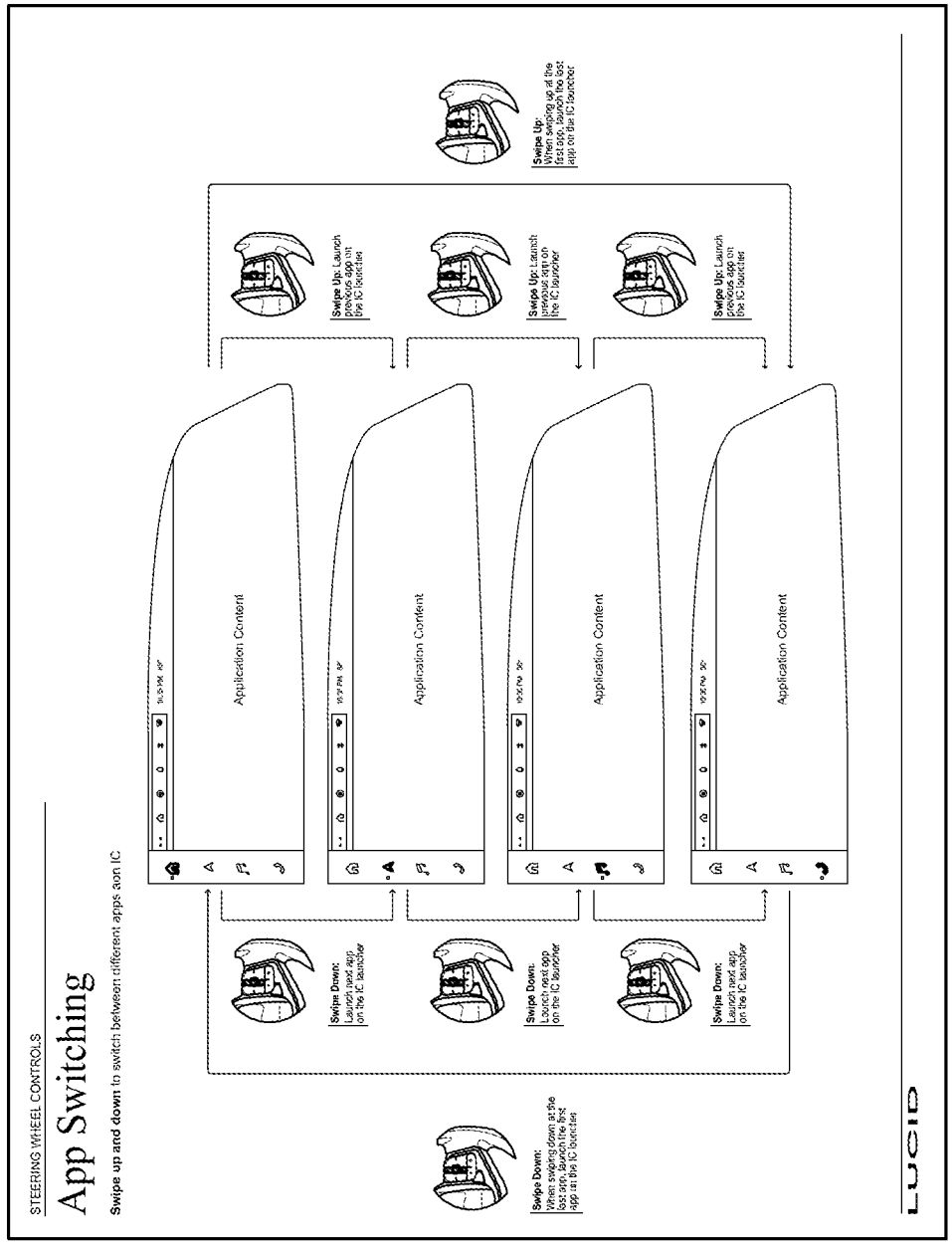
FIG. 14 illustrates application switching according to some embodiments of the disclosure.

With reference to FIG. 14, application switching will be described. As shown in FIG. 14, by swiping up and down by the driver on the right capacitive controller of the steering wheel applications on the right IC display can be switched. As an example, there may be a predefined number of applications. For example, when swiping up at the first application, the last application is launched on the IC launcher. Swipes up launch previous applications on the IC launcher. On the other hand, when swiping down at the last application, the first application is launched on the IC launcher. Swipes down launch next applications on the IC launcher.

Figure 15:
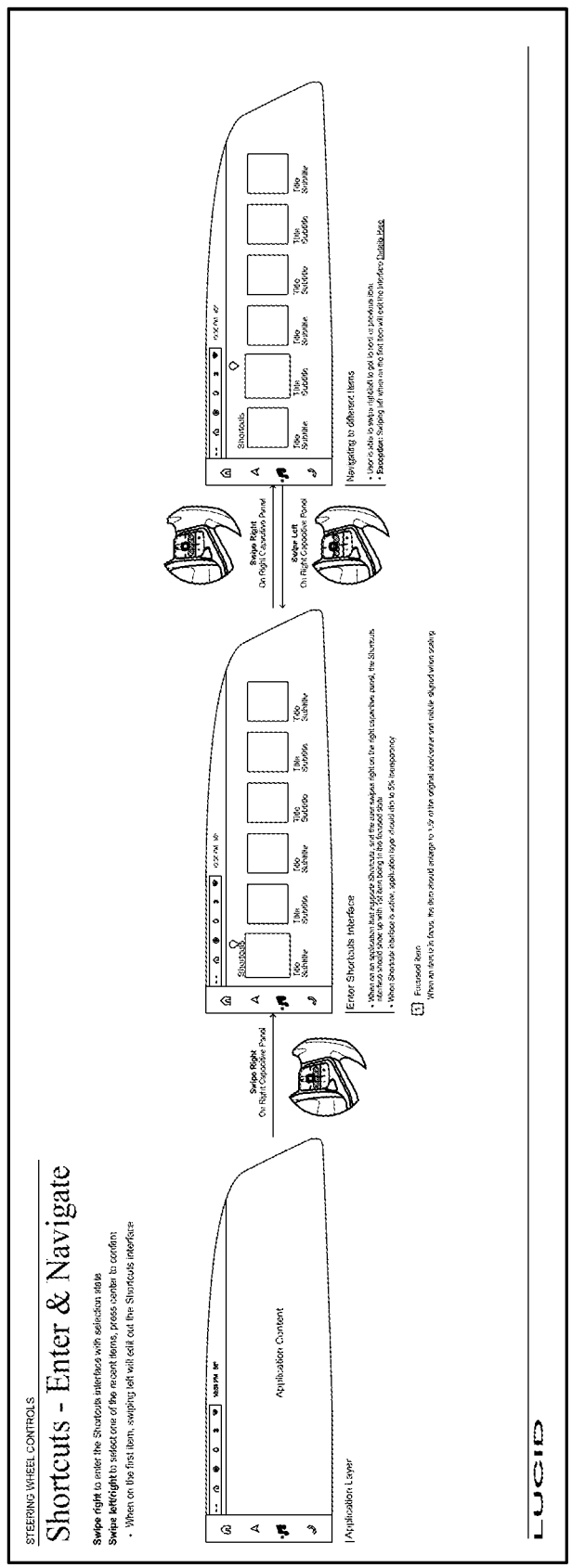
FIG. 15 illustrates entering and navigating short cuts according to some embodiments of the disclosure.

With reference to FIG. 15, entering and navigating short cuts will be described. As shown in FIG. 15, by swiping right by the driver on the right capacitive controller of the steering wheel, application item shortcuts on the right IC display can be entered and navigated. As an example, there may be a predefined number of shortcuts for application items. In some embodiments, after swiping right, the driver can swipe left or right to select one of the recent application items. In some embodiments, the driver can press the center button on the right capacitive controller to confirm the selection of the application item as shortcut. When on the first item, swiping left will exit out of the shortcut interface. When an application item supports shortcuts, the shortcut should be in the focused state. When an application item is in the focused state it should be a predetermined amount larger than the original state. In some embodiments, the driver can swipe left or right to get to next or previous recent application items on the right IC display and the driver can press the center button on the right capacitive controller to confirm the selection of the application item as shortcut.

Figure 16:
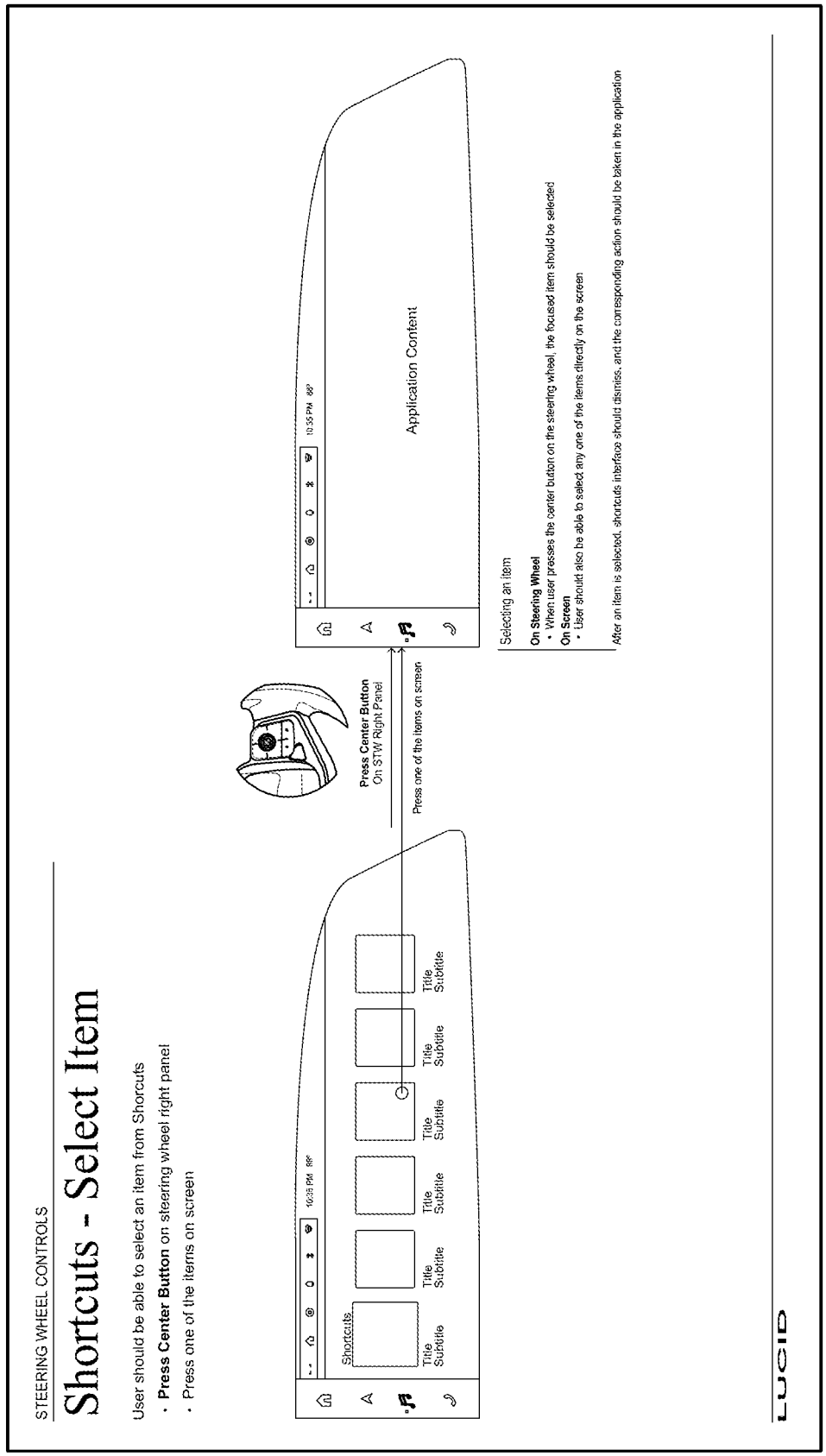
FIG. 16 illustrates selecting an application item for a shortcut according to some embodiments of the disclosure.

With reference to FIG. 16, selecting an application item for a shortcut will be described. As shown in FIG. 16, the driver can press the center button on the right capacitive controller to confirm the selection of an application item as a shortcut on the right IC display. Also, in some embodiments, the driver can also select the application item as a shortcut on the right IC display by touching the application item with their finger on the right IC touchscreen display itself. After an application item is selected, the shortcut interface should be dismissed, and the corresponding action should be taken in the application.

Figure 17:
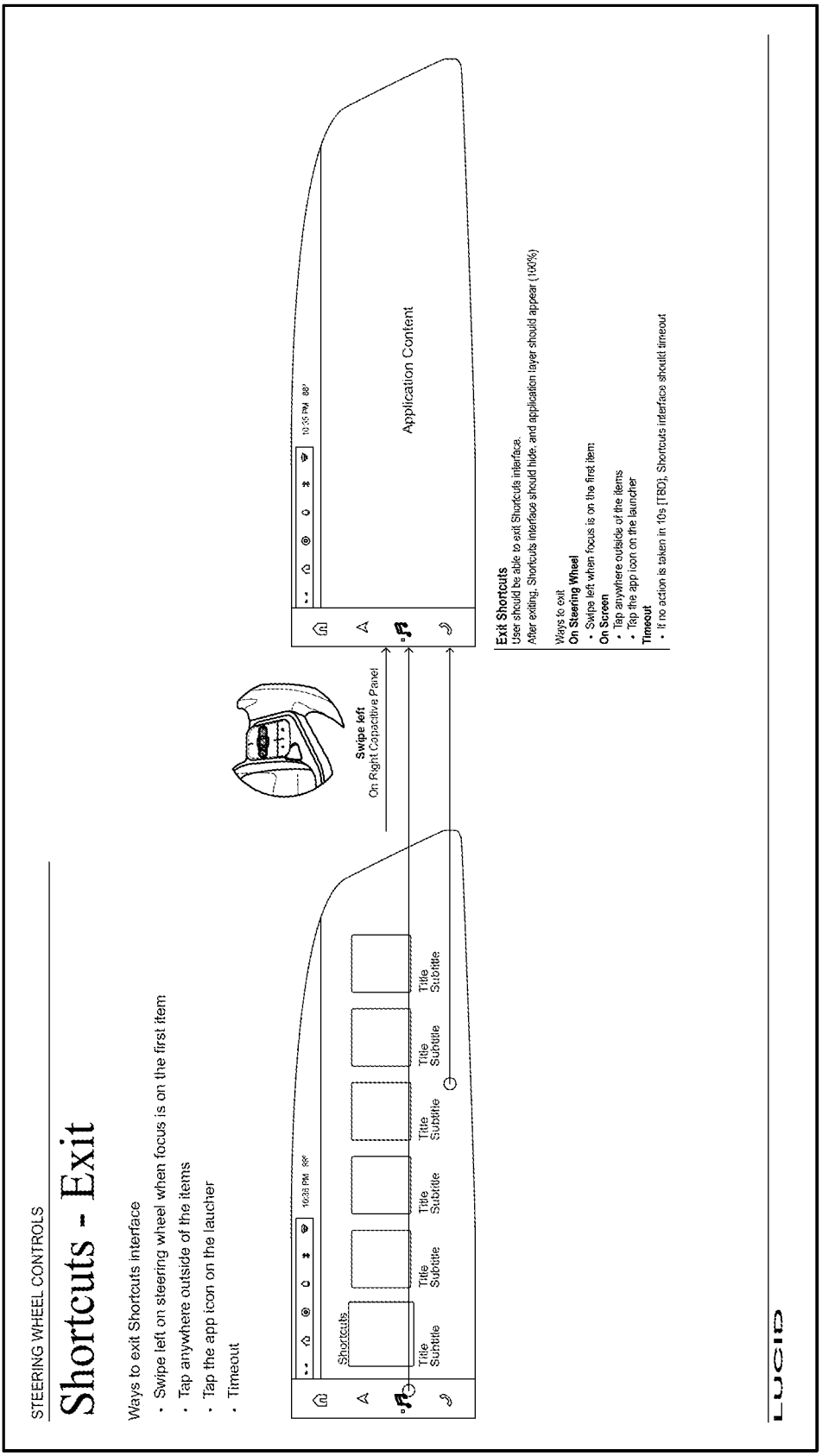
FIG. 17 illustrates exiting out of the shortcut interface according to some embodiments of the disclosure.

With reference to FIG. 17, ways to exit out of the shortcut interface will be described. As shown in FIG. 17, in some embodiments, the to exit out the shortcut interface the driver can: swipe left on the on the right capacitive controller of the steering wheel when the focus is on the first application item on the right IC display; the driver can tap anywhere outside of the applications items on the right IC display; the driver can tap the application icon on the launcher on the right IC display; or a timeout can occur. After exiting the shortcuts interface should hide and the application layer should appear.

Figure 18:
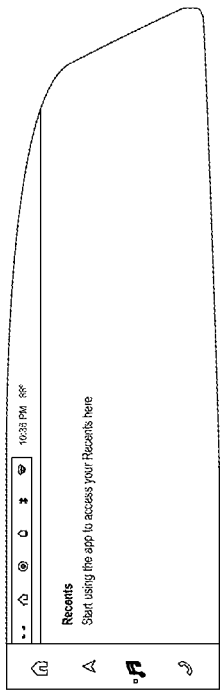
FIG. 18 illustrates an empty shortcut state according to some embodiments of the disclosure.

With reference to FIG. 18, an empty shortcut state will be described. As shown in FIG. 18, when there has been no recent history of application items used (e.g., Nav, Media, Phone) an empty state should be displayed on the right IC display.

Figure 19:
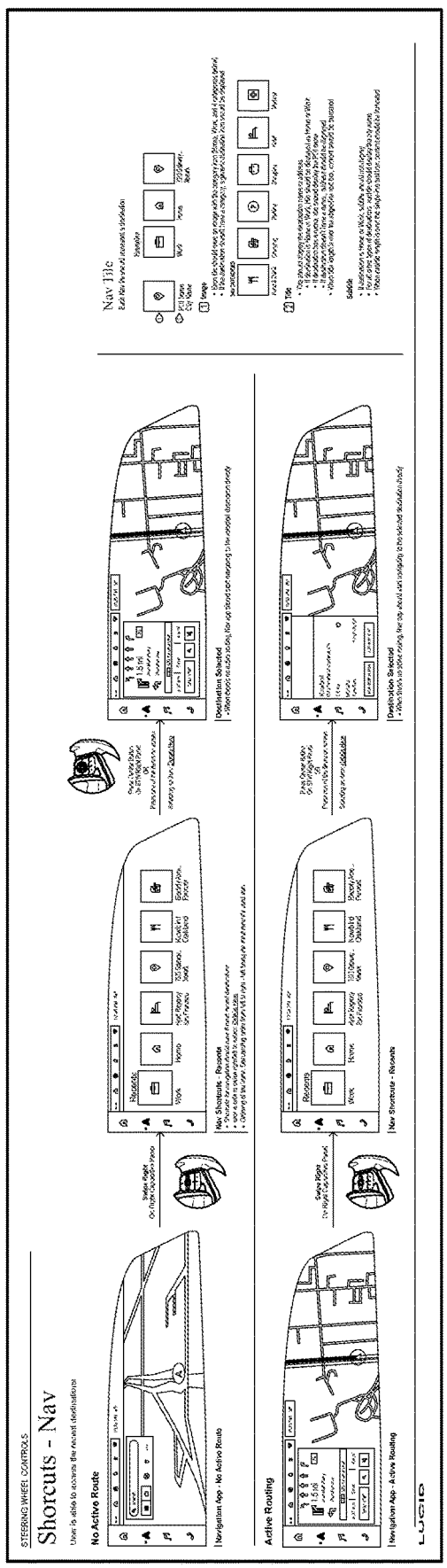
FIG. 19 illustrates short cuts for navigation according to some embodiments of the disclosure.

With reference to FIG. 19, short cuts for navigation will be described. As shown in FIG. 19, no active routing is being used, and by swiping right by the driver on the right capacitive controller of the steering wheel, shortcuts for the 6 most recent destinations appear on the right IC display, the driver can then swipe right/left to scroll to a recent destination (destinations are shown from left to right (left being most recently used)), the driver can push the center button on the right capacitive controller to select the destination or press the destination on the touchscreen right IC display, and the navigation application should start navigating to the selected destination. Further, as shown in FIG. 19, below initiating active routing, after active routing has been established, the selection of new destination operates primarily in the exact same way. However, once active routing is already being done, once a user selects a recent destination, the navigation application also display a POI card showing two options to either add as new destinations or to add as waypoints.

Figure 20:
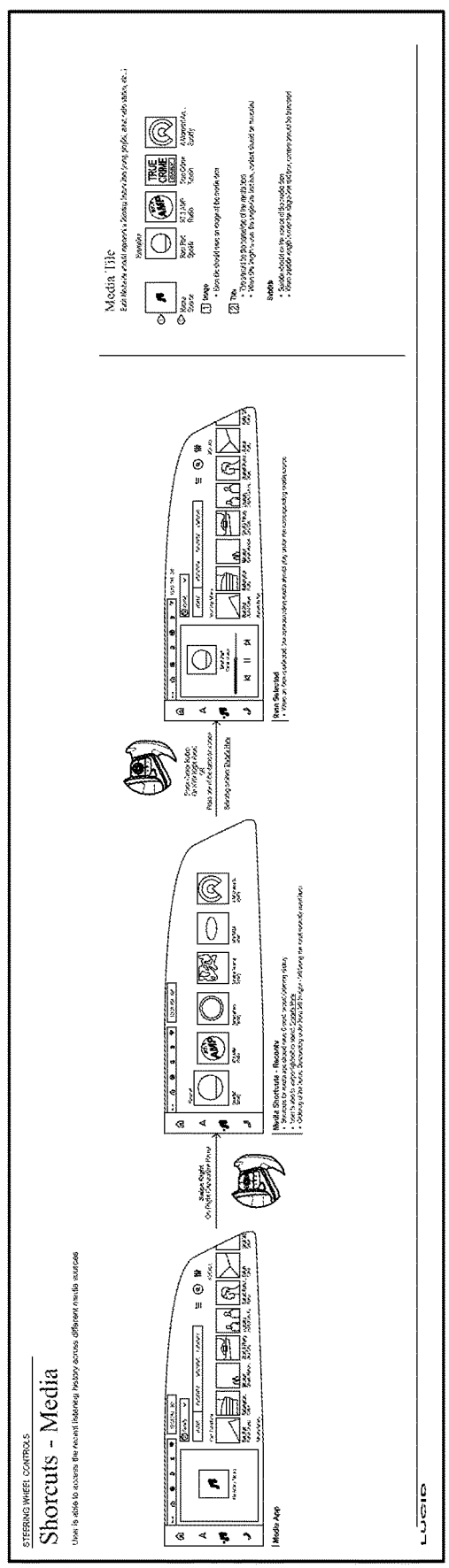
FIG. 20 illustrates short cuts for media according to some embodiments of the disclosure.

With reference to FIG. 20, short cuts for media will be described. As shown in FIG. 20, on the media application, by swiping right by the driver on the right capacitive controller of the steering wheel, shortcuts for the 6 most recent listening history items (across different media sources), appear on the right IC display. In some embodiments, the driver can the swipe right/left to scroll to a recent media item (media items are shown from left to right (left being most recently listened to)), the driver can push the center button on the right capacitive controller to select the desired media item or press the media item on the touchscreen right IC display, and the media item will be selected for playback to the driver (under the corresponding media source).

Figure 21:
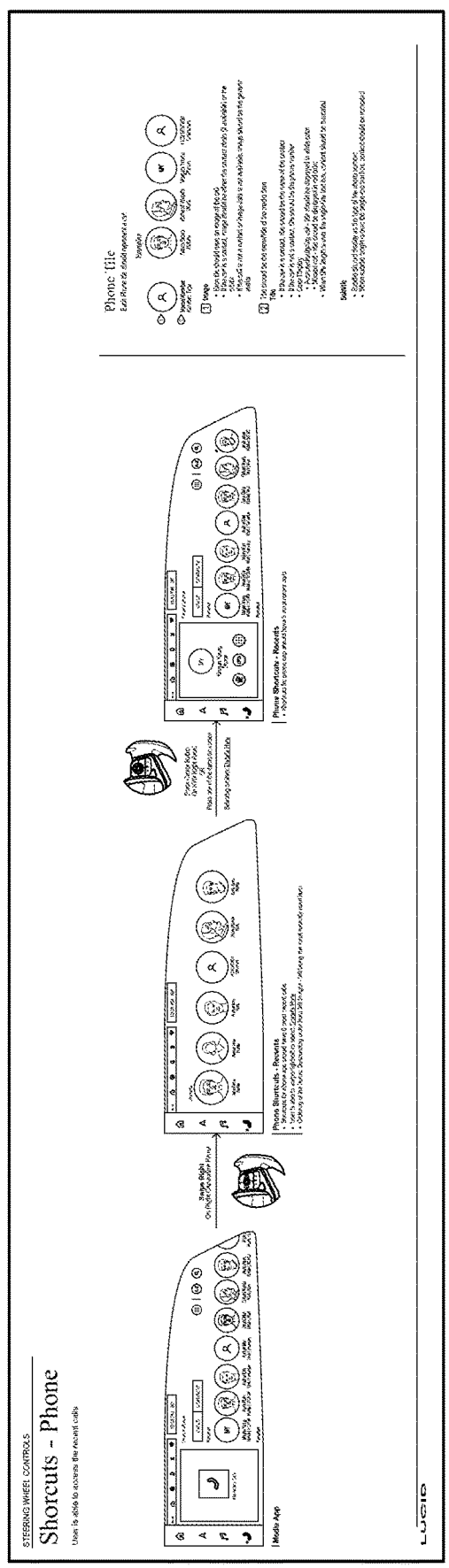
FIG. 21 illustrates short cuts for phone service according to some embodiments of the disclosure.

With reference to FIG. 21, short cuts for phone service will be described. As shown in FIG. 21, on the phone application, by swiping right by the driver on the right capacitive controller of the steering wheel, shortcuts for the most recent listening of phone calls (e.g., 6 calls), appear on the right IC display. In some embodiments, the driver can the swipe right/left to scroll to a recent phone contact item (phone contact items are shown from left to right (left being most recently communicated with (incoming/outgoing call)), the driver can push the center button on the right capacitive controller to select the desired media item or press the phone call item on the touchscreen right IC display, and the phone call item (phone number) will be selected for making the phone call for the driver.

As previously described, embodiments relate to capacitive controllers on the steering wheel that may be utilized to allow the user to scroll through application functions and select application functions and activate application functions with one hand and a single finger (e.g., the thumb) on the front cockpit display right in front of them, while driving. This increases vehicle safety, by keeping the driver's hands on the wheel. As has been described, frequently used application functions may be completed quickly and with very little effort, while the driver keeps their hand on the steering wheel. As previously described in detail, the right and left capacitive controllers as they interact with right and left IC cockpit displays involve contextual mapping, such that the driver can swipe left, right, up, down, to reach desired functions and then select them for saving as shortcuts and/or for automatic implementation. For example, the selection of an application function for saving as a shortcut and/or automatic implementation can occur by a center press of the capacitive controller (e.g., in the middle of the capacitive controller) by the driver (e.g., such that it is intentional selection by the driver). As has been described, the most frequently used applications by the driver can be easily searched for and selected by swiping on the capacitive controller and pressing on the center press of the capacitive controller for saving as a shortcut for subsequent selection and/or for automatic implementation. These application functions include at least common application functions, such as: media, navigation, phone, data, etc.

It should be appreciated that the operations of the previously described processes in some embodiments may be performed: by the controller 101 of the vehicle 100 including: a processor, memory communication links, user interfaces, etc., to implement the previously described processes.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore, the disclosures and descriptions herein are intended to be illustrative, but not limiting, of the scope of the invention.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

For example, the previously described embodiment operations may be stored as instructions on a non-transitory computer readable medium for execution by a controller, processor, computer, etc. The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMS, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method of selecting and implementing a function selectable by a custom button by a user in a vehicle, utilizing an on-board system controller, the on-board system controller comprising a processor and a memory, the method comprising the operations of:
   identifying a first pressing of the custom button for a first time period, the custom button being at least one of: on a steering wheel of the vehicle as a steering wheel button, or below a display panel of the vehicle as a first custom button;
   receiving a selection of the function from the display panel of the vehicle, a second pressing of the first custom button for the first time period defining the function and a third pressing of the first custom button for a second time period redefining the function, wherein the second time period is greater than the first time period;
   linking the function to the custom button;
   automatically implementing the function subsequently pressing of the custom button for a fourth time period, and
   further comprising another custom button being displayed on the display panel as a second custom button, wherein, when the second custom button is pressed for the first time period by the user while driving, the function from the display panel is selectable by the user and is linked to the second custom button, such that, when the user subsequently presses the second custom button for the first time period, the function is automatically implemented.

2. The method of claim 1, wherein the steering wheel button is accessible by a finger of the user while a hand of the user is on the steering wheel and while driving.

3. The method of claim 2, wherein, when the steering wheel button is single pressed initially by the user, the function from the display panel is selectable by the user and is linked to the steering wheel button, such that, when the user subsequently single presses the steering wheel button, the function is automatically implemented.

4. The method of claim 3, wherein, when the steering wheel button is pressed and held in a pressed state for a second time period by the user, the function from the display panel is selectable by the user that is linked to the steering wheel button, such that, when the user subsequently presses the steering wheel button for the first time period, the function is automatically implemented.

5. The method of claim 4, wherein the second time period includes time to display a menu on the display panel.

6. The method of claim 4, wherein, selectable functions by the user on the display panel that are linked to the steering wheel button for automatic implementation include at least one of: media functions, parking functions, driving functions, or braking functions.

7. The method of claim 1, wherein the receiving the selection of the function from the display panel of the vehicle comprises:
   tapping on the display panel, and further comprising storing an indication that the custom button is assigned the function as part of a user profile of the user.

8. The method of claim 1, wherein, when the second custom button is pressed and held in a pressed state for a second time period, the function from the display panel is selectable by the user that is linked to the second custom button, such that, when the user subsequently presses the second custom button for the first time period, the function is automatically implemented and further, wherein, selectable functions by the user on the display panel that are linked to the display panel button for automatic implementation include at least one of: climate functions, application functions, mode functions, or other functions.

9. The method of claim 1, wherein the linking the function to the custom button is based on the first pressing, the second pressing, and the third pressing.

10. An on-board system controller for a vehicle to implement a method of selecting and implementing a function selectable by a custom button by a user in the vehicle comprising:
    a memory; and
    a processor coupled to memory, wherein the processor is configured to perform operations comprising:
    identifying a first pressing of the custom button for a first time period, the custom button being at least one of: on a steering wheel of the vehicle as a steering wheel button, or below a display panel of the vehicle as a first custom button;
    receiving a selection of the function from the display panel of the vehicle, a second pressing of the first custom button for the first time period defining the function and a third pressing of the first custom button for a second time period redefining the function, wherein the second time period is greater than the first time period;
    linking the function to the custom button;
    automatically implementing the function subsequently pressing of the custom button for a fourth time period, and further comprising another custom button being displayed on the display panel as a second custom button, wherein, when the second custom button is pressed for the first time period by the user while driving, the function from the display panel is selectable by the user and is linked to the second custom button, such that, when the user subsequently presses the second custom button for the first time period, the function is automatically implemented.

11. The system controller of claim 10, wherein the steering wheel button is accessible by a finger of the user while a hand of the user is on the steering wheel and while driving.

12. The system controller of claim 11, wherein, when the steering wheel button is single pressed initially by the user, a function from the display panel is selectable by the user and is linked to the steering wheel button, such that, when the user subsequently single presses the steering wheel button, the function is automatically implemented.

13. The system controller of claim 12, when the steering wheel button is pressed and held in a pressed state for a second time period by the user, the function from the display panel is selectable by the user that is linked to the steering wheel button, such that, when the user subsequently presses the steering wheel button for the first time period, the function is automatically implemented.

14. The system controller of claim 13, wherein the second time period includes time to display a menu on the display panel.

15. The system controller of claim 13, wherein, selectable functions by the user on the display panel that are linked to the steering wheel button for automatic implementation include at least one of: media functions, parking functions, driving functions, or braking functions.

16. The system controller of claim 10, wherein the receiving the selection of the function from the display panel of the vehicle comprises:
  tapping on the display panel, and further comprising storing an indication that the custom button is assigned the function as part of a user profile of the user.

17. The system controller of claim 10, wherein, when the second custom button is pressed and held in a pressed state for a second time period, the function from the display panel is selectable by the user that is linked to the second custom button, such that, when the user subsequently presses the second custom button for the first time period, the function is automatically implemented and further, wherein, selectable functions by the user on the display panel that are linked to the display panel button for automatic implementation include at least one of: climate functions, application functions, mode functions, or other functions.

* * * * *